United States Patent
Kang et al.

(10) Patent No.: US 11,497,372 B2
(45) Date of Patent: Nov. 15, 2022

(54) AIR PURIFYING SYSTEM AND CONTROL METHOD FOR THE AIR PURIFYING SYSTEM

(71) Applicants: LG ELECTRONICS INC., Seoul (KR); CHUNGANG UNIVERSITY INDUSTRY ACADEMIC COOPERATION FOUNDATION, Seoul (KR)

(72) Inventors: Jiyoung Kang, Seoul (KR); Haeyoong Chung, Seoul (KR); Jongkeon Jeon, Seoul (KR); David Kangseong Lee, Seoul (KR); Daeyoung Kwak, Seoul (KR); Sohee Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 344 days.

(21) Appl. No.: 16/821,871

(22) Filed: Mar. 17, 2020

(65) Prior Publication Data
US 2020/0297180 A1   Sep. 24, 2020

(30) Foreign Application Priority Data

Mar. 19, 2019 (KR) .......... 10-2019-0031452
Jul. 29, 2019 (KR) .......... 10-2019-0091555

(51) Int. Cl.
*A47L 11/40* (2006.01)
*B01D 46/00* (2022.01)
(Continued)

(52) U.S. Cl.
CPC ....... *A47L 11/4094* (2013.01); *A47L 11/4011* (2013.01); *A47L 11/4091* (2013.01);
(Continued)

(58) Field of Classification Search
CPC .............. A47L 11/4094; A47L 11/4011; A47L 11/4091; A47L 2201/022; A47L 46/0013;
(Continued)

(56) References Cited

U.S. PATENT DOCUMENTS 6,466,737 B1   10/2002  Birdsell et al.
2003/0024218 A1*  2/2003  Stephens ............ B01D 46/0013
                                                        55/413
(Continued)

FOREIGN PATENT DOCUMENTS

AU    2017255209     12/2018
CN    1651827        8/2005
(Continued)

OTHER PUBLICATIONS

Chinese Office Action issued in Application No. 2021052802933920 dated Jun. 2, 2021.
(Continued)

*Primary Examiner* — Yazan A Soofi
(74) *Attorney, Agent, or Firm* — Ked & Associates, LLP

(57) ABSTRACT

An air purifying system includes a robot cleaner configured to generate map information during vacuum cleaning and at least one air purifier that is operated based on the generated map information. Air purifying is performed using updated map information acquired by the robot cleaner during cleaning. The at least one air purifier includes two portable air purifiers mounted on a base air purifier. The two portable air purifiers are configured to be lifted from the base air purifier and moved to separate indoor rooms. The base air purifier includes a controller that determines, based on the generated map information and other information, which rooms the two portable air purifiers should be placed in so that air purifying may be efficient.

20 Claims, 19 Drawing Sheets

(51) Int. Cl.
  *B01D 46/46* (2006.01)
  *G05D 1/02* (2020.01)
(52) U.S. Cl.
  CPC ......... *B01D 46/0013* (2013.01); *B01D 46/46* (2013.01); *G05D 1/0274* (2013.01); *A47L 2201/022* (2013.01); *A47L 2201/04* (2013.01); *B01D 2221/08* (2013.01); *B01D 2279/55* (2013.01); *G05D 2201/0215* (2013.01)
(58) Field of Classification Search
  CPC  B01D 46/0013; B01D 46/46; B01D 2221/08; B01D 2279/08; G05D 1/0274; G05D 2201/0215
  USPC .......................................................... 95/278
  See application file for complete search history.

(56)           References Cited

U.S. PATENT DOCUMENTS

| | | | | |
|---|---|---|---|---|
| 2005/0172816 | A1* | 8/2005 | Son ................... | B01D 46/0028 96/417 |
| 2014/0020561 | A1* | 1/2014 | Aery ..................... | B01D 46/60 55/467 |
| 2018/0299899 | A1* | 10/2018 | Suvarna ................ | H04W 16/20 |
| 2019/0021568 | A1* | 1/2019 | Kim ....................... | A47L 9/2852 |
| 2019/0056126 | A1* | 2/2019 | Law ......................... | F24F 6/00 |
| 2019/0276241 | A1* | 9/2019 | Royce ...................... | B67C 3/00 |
| 2020/0030736 | A1* | 1/2020 | Yun ......................... | B01D 46/10 |
| 2022/0122397 | A1* | 4/2022 | Cristache .............. | B25J 9/1664 |

FOREIGN PATENT DOCUMENTS

| | | |
|---|---|---|
| CN | 1752617 | 3/2006 |
| CN | 1291684 | 12/2006 |
| CN | 201251250 | 6/2009 |
| CN | 204858756 | 12/2015 |
| CN | 105333528 | 2/2016 |
| CN | 105757817 | 7/2016 |
| CN | 107042040 | 8/2017 |
| CN | 107270391 | 10/2017 |
| CN | 107401803 | 11/2017 |
| CN | 206669923 | 11/2017 |
| CN | 107575944 | 1/2018 |
| CN | 107728484 | 2/2018 |
| CN | 108180616 | 6/2018 |
| CN | 108895538 | 11/2018 |
| CN | 208579441 | 3/2019 |
| EP | 3127462 | 2/2017 |
| EP | 3211343 | 8/2017 |
| JP | H04-103925 | 4/1992 |
| KR | 10-2008-0051976 | 6/2008 |
| KR | 10-2009-0114028 | 11/2009 |
| KR | 10-1698045 | 1/2017 |
| KR | 10-2017-0044553 | 4/2017 |
| WO | WO 2004/108248 | 12/2004 |

OTHER PUBLICATIONS

European Search Report dated Aug. 12, 2020 issued in Application No. 20163818.6.
European Search Report dated Aug. 20, 2020 issued in Application No. 20164348.3.
European Search Report dated Aug. 14, 2020 issued in Application No. 20164334.3.
Chinese Office Action issued in Application No. 202010182206.6 dated Mar. 31, 2021.
Chinese Office Action dated Jun. 3, 2021 issued in Application No. 202010190947.9.

* cited by examiner

AIR PURIFYING SYSTEM AND CONTROL METHOD FOR THE AIR PURIFYING SYSTEM

CROSS-REFERENCE TO RELATED APPLICATION(S)

This application claims priority under 35 U.S.C. § 119 to Korean Application Nos. 10-2019-0031452 filed on Mar. 19, 2019 and 10-2019-0091555 filed on Jul. 29, 2019, whose entire disclosure(s) is/are hereby incorporated by reference.

BACKGROUND

1. Field

The present disclosure relates to an air purifying system and a control method of the air purifying system.

2. Background

An air cleaner or purifier may be an apparatus that suctions contaminated air, filters or purifies the contaminated air, then discharges the purified air. For example, an air purifier may include an air blowing device or fan to introduce outside air into an interior of the air cleaner and a filter to filter dust, germs, and other foreign matter (hereinafter "foreign matter") from the air. Generally, an air purifier may be configured to purify an interior space or room such as a home or office.

An air purifier may be manufactured in a predetermined size and shape according to a predetermined design and supplied to the market. A consumer may purchase an air purifier that approximately matches a size and air cleaning capacity desired. However, due to a lack of customization, it may be difficult for a consumer to purchase an air cleaner that is suited to his or her particular residential environment, which may include a plurality of indoor rooms having various shapes, sizes, and air quality. It may be especially difficult for customers to gauge which air purifier to purchase for an atypical room having an unusual shape or design.

WO 2004/00108248 A2 discloses a modular air purification system capable of modularizing or customizing a filter member in response to an installation environment of an air purifier, but this modularizing must be done only by an expert, and cannot be performed by a general user.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
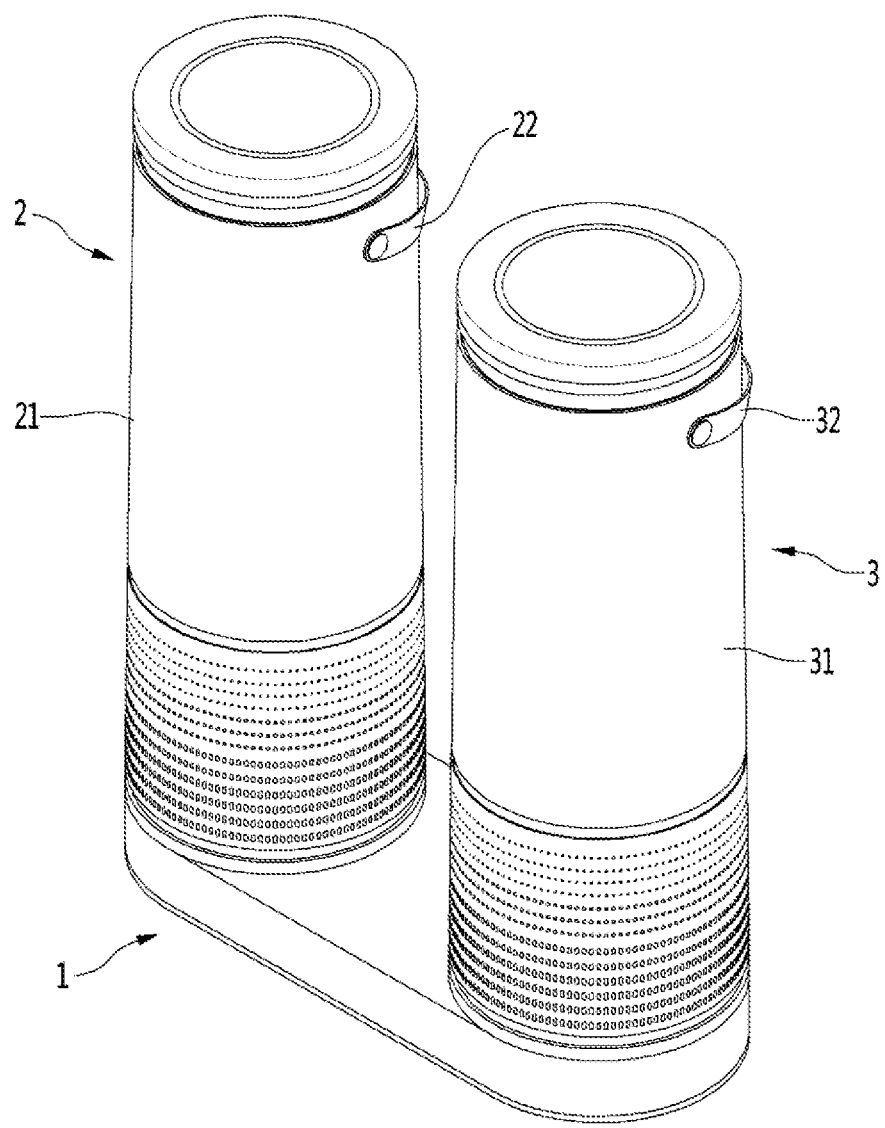
FIG. 1 is a perspective view of an air purifying system according to an embodiment.

Referring to FIG. 1, an air purifying or cleaning system according to an embodiment may include at least two air purifiers or cleaners 2 and 3 capable of independent operation and a base 1 configured to support the two air purifiers 2 and 3. The two air purifiers 2 and 3 may be configured to be seated on and removed from the base 1. The two air purifiers 2 and 3 may be referred to as portable air purifiers 2 and 3, as the two air purifiers 2 and 3 may be removed from the base 1 and moved to various rooms or locations.

The base 1 may function as an air purifier. Alternatively, the base 1 may not function as an air purifier and may serve primarily as a docking or charging station for the portable air purifiers 2 and 3. The base 1 may be referred to as a base or docking station regardless of whether the base 1 is also an air purifier. For convenience of description, an embodiment where the base 1 is also an air purifier will be described and will be referred to as a base air purifier 1.

The at least two air purifiers 2 and 3 may be configured to stand upright on the base air purifier 1. The air purifiers 2 and 2 may extend in a vertical direction and have a cylindrical shape. The air purifiers 2 and 3 may suction air from a radial direction and/or an axial direction (from a bottom), and discharge air radially outward and/or upward.

The base air purifier 1 may be provided in a shape that is long in a left-right or horizontal direction with respect to a front face. The at least two portable air purifiers 2, 3 may include a first portable air purifier 2 and a second air purifier 3. The first portable air purifier 2 may be configured to be supported on a left side of the base air purifier 1 and the second portable air purifier 3 may be configured to be supported on a right side of the base air purifier 1. Additional (e.g., third, fourth, etc.) portable air purifiers may be provided. However, two portable air purifiers 2 and 3 may be sufficient considering a large range of areas at which air may be discharged from the first and second portable air purifiers 2 and 3 and considering an interference of discharged air that may occur.

Handles 22 and 32 may be provided at upper portions of the portable air purifiers 2 and 3, respectively, so that the user may move or transport the first and second portable air purifiers 2 and 3. The handles 22 and 32 may rotate over tops of main bodies 21 and 31, respectively, of the first and second air purifiers 2 and 3. The handles 22 and 32 may be hinged to a side surface of the main bodies 31 and 31 by a hinge structure to be rotatable over the tops so that, when the user is not using the handles 22 and 32, the handles 22 and 32 may be rotated down to a non-use position to be supported by the side surface of the main bodies 31 and 31. A size and shape of the handles 22 and 32 may be configured such that, when rotated down to the non-use position, the handles 22 and 32 may not interfere with a discharge of air.

Due to a long cylindrical shape of the portable air purifiers 2 and 3, the portable air purifiers 2 and 3 may be easily overturned. The base air purifier 1 may be configured to support and maintain stable positions of the portable air purifiers 2 and 3 so that the portable air purifiers 2 and 3 may be stored and charged in a secured state.

Figure 2:
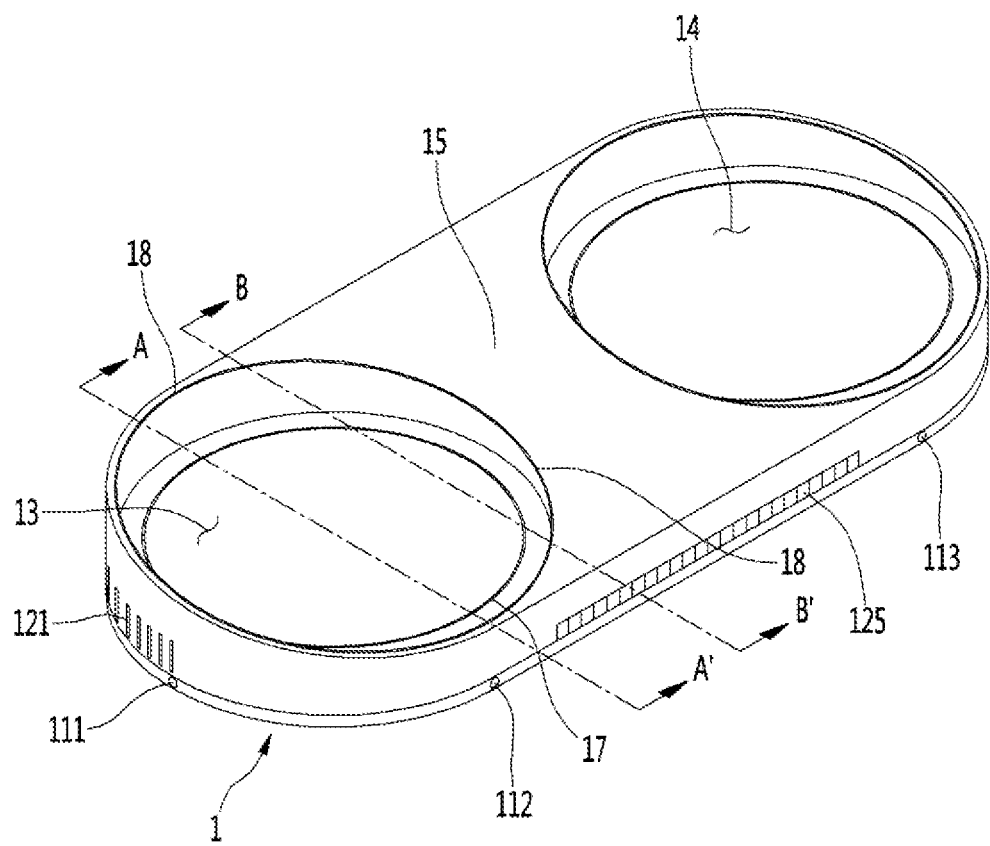
FIG. 2 is a perspective view of a base or main air purifier.
Figure 3:
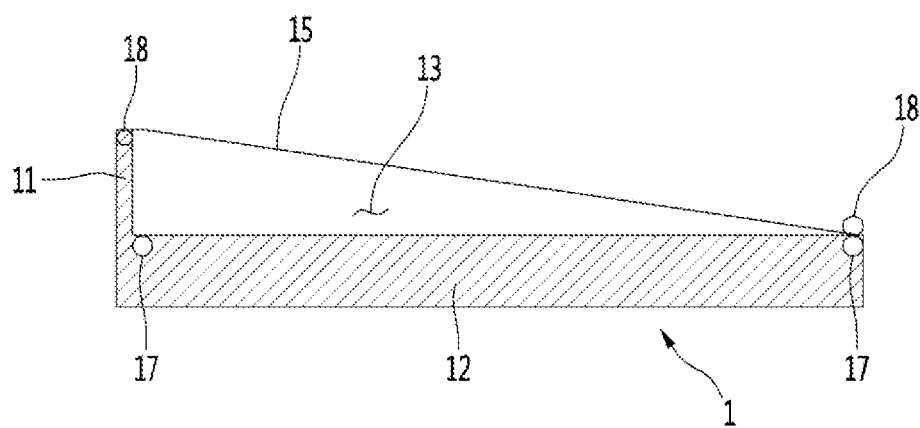
FIG. 3 is a schematic sectional view taken along the line A-A' of FIG. 2.

Referring to FIGS. 2 and 3, the base air purifier 1 may have a predetermined height. An upper surface of the base air purifier 1 may include an inclined surface 15 that is inclined downward toward a front such that a height decreases from a rear to a front. The upper surface of the base air purifier 1 may also include seating grooves or recesses 13 and 14 formed by depressing the inclined surface 15 downward. The seating grooves 13 and 14 may be configured to support a bottom of the main bodies 21 and 31 of the first and second portable air purifiers 2 and 3, respectively. The seating grooves 13 and 14 may be provided on left and right sides of the upper surface of the base air purifier 1. A bottom surface of the main bodies 21 and 31 may be placed on a bottom surface of the seating grooves 13 and 14, which may be flat, and sidewalls of the seating grooves 13 and 14 may prevent the portable air purifier 2 and 3 from overturning.

A groove may be provided on one of the seating grooves 13 and 14 or the main bodies 21 and 31, and a protrusion corresponding to the groove may be provided on the other of the seating grooves 13 and 14 of the main bodies 21 and 31 so as to further secure the portable air purifiers 2 and 3 in the seating grooves 13 and 14. As an example, an arc-shaped protrusion may be provided on the bottom surface of the main bodies 21 and 31, while an arc-shaped groove may be provided on the bottom surface of the seating grooves 13 and 14. When the portable air purifiers 2 and 3 are placed in the seating grooves 13 and 14, the protrusions of the main bodies 21 and 31 may be guided into the grooves of the seating grooves 13 and 14. The protrusions and grooves may have positions such that, when the protrusions are inserted into the grooves, a front of the portable air purifiers 2 and 3 may face a front side, which the front of the base air purifier 1 may face. Such an orientation of the base and portable air purifiers 1, 2, and 3 may be referred to as an installation orientation or position. A direction of air discharged from the base and portable air purifiers 1, 2, and 3 may be controlled or adjusted based on the installation orientation.

The seating grooves 13 and 14 may be recessed to a predetermined depth configured to reduce or prevent a possibility that the portable air purifiers 2 and 3 will overturn. Due to the inclined surface 15, rear portions of the sidewalls of the seating grooves 13 and 14 may be higher than front portions of the sidewalls so as to withstand an external force applied at the front of the portable air purifiers 2 and 3. The height of the side wall of each of the seating grooves 13 and 14 may gradually decrease toward the front so as to withstand an external force applied to a side of the portable air purifiers 2, 3.

A front portion of the sidewalls of the seating groove 13 and 14 may be level with the bottom surface of the seating grooves 13 and 14 so that the user may conveniently place or remove the portable air purifiers 2 and 3 in or from the seating grooves 13 and 14 from a front. An upper end of a lower or side wall 12 of the base air purifier 1 may be provided at a same height as the front portion of the sidewall of the seating grooves 13 and 14.

A first light device 17 (e.g., a ring-shaped light emitting diode or LED) may surround a bottom edge of each seating groove 13 and 14 to help the user to correctly seat the portable air purifier 2 and 3 into the seating grooves 13 and 14. A second light device 18 (e.g., a ring-shaped light emitting diode or LED) may surround a top edge or rim of the seating grooves 13 and 14. The user may gauge an inclination angle of the sidewalls and determine a height of the bottom surfaces of the seating grooves 13 and 14 by comparing positions of the first and second light devices 17 and 18. At the front, the first and second light devices 17 and 18 may be adjacent to each other in a vertical direction. At the rear, the first and second light devices 17 and 18 may be spaced apart from each other by approximately a height of the sidewall of the seating grooves 13 and 14.

The bottom surfaces of the seating grooves 13 and 14 may be defined by an upper surface of the lower wall 12, which may be flat to support the first and second portable air purifiers 2 and 3. A rear wall 11 may extend from a rear of the lower wall 12 to support the rear portion of the side walls of the seating grooves 13 and 14 and the portable air purifiers 2 and 3 to prevent overturning. An external force is more likely to be applied at a front of the portable air purifiers 2 and 3 than at a rear or side, as the user may more often approach the front of the base air purifier 1 for seating and removal of the portable air purifiers 2 and 3 and because the base air purifier 1 may be long in the left-right direction.

When the portable air purifiers 2 and 3 are seated in the seating grooves 13 and 14, the base air purifier 1 may be configured to charge the portable air purifiers 2 and 3 wirelessly and/or via a wired connection, which will be described in more detail with reference to FIGS. 12 and 13. In addition, the base and portable air purifiers 1, 2, and 3 may be configured to operate in a variety of combinations and settings based on positions of the base and portable air purifiers 1, 2, 3, a mounting status of the portable air purifiers 2 and 3, a user's preferences, and/or map information obtained from sensors or a remote source.

The base air purifier 1 may include wireless transmitters, receivers, or transceivers 111, 112, and 113 provided at predetermined intervals at a lower edge of the lower wall 12 to transmit and/or receive a wireless signal to determine information on a space or zone where the base air purifier 1 is placed. Embodiments disclosed herein are not limited to three wireless transceivers, and the base air purifier 1 may include, for example, two more wireless transmitters, receivers, and/or transceivers for a total of five transceivers.

A signal of the wireless transceivers may be implemented in various ways. For example, signals sent and received by the wireless transceivers may be infrared rays, lasers, high frequency, and/or ultra-wideband microwaves. A number of transceivers may be reduced or increased depending on a frequency of a carrier light. As an example, the transceivers may send and receive laser signals from two front and rear wireless transceivers to measure dimensions of an indoor room or space. The transceivers may alternatively be sensors (e.g., laser proximity sensors).

When the base air purifier 1 is also an air purifier, the base air purifier 1 may include a suction portion 121 provided at a rear or side portion of the lower wall 12 and a discharge portion provided at a front portion of the lower wall 12.

Figure 4:
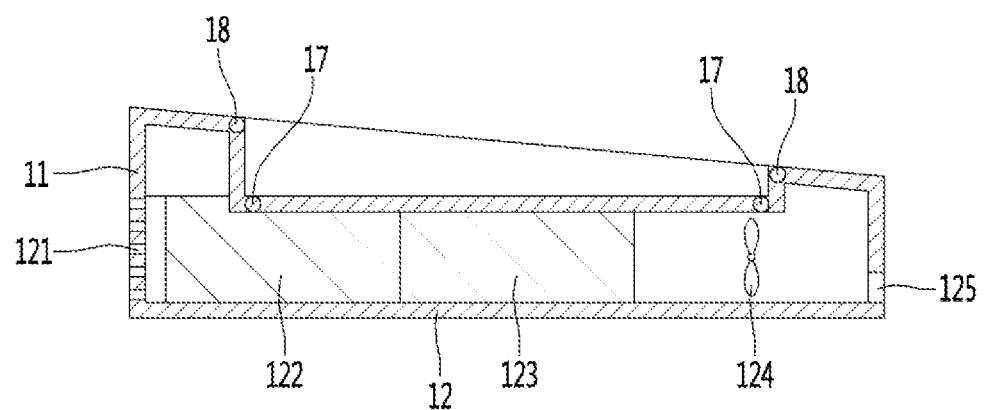
FIG. 4 is a sectional view taken along the line B-B' in FIG. 2.

Referring to FIG. 4, the lower wall 12 may define an internal space under the upper surface of the base air purifier 1. The suction portion 121 may be formed as at least one opening or hole in the rear of the lower wall 12. The discharge portion 125 may be formed as at least one hole or opening in the front of the lower wall 12. At least one filter 122, 123 and at least one fan 124 may be provided in the inner space of the base air purifier 1 so that ambient air may be suctioned through the suction portion 121 by the fan 124 into the inner space, filtered by the filter 122, 123, and discharged through the discharge portion 125 back outside of the base air purifier 1.

The at least one filter 122, 123 may include a first filter 122 and a second filter 123 arranged sequentially with respect to a flow of suctioned air. Since the suction portion 121 may be formed at the rear, the first filter 122 may be provided at a rear of the inner space, and the second filter 123 may be provided in front of the first filter 122. The first and second filters 122 and 123 may be any combination of a HEPA filter, a carbon filter, a pleated filter, a mesh filter, a strainer, etc. The first filter 122 may be configured to filter foreign matter of a larger particle size than foreign matter the second filter 123 may be configured to filter. As an example, the first filter 122 may be a filter having a larger filter mesh or larger openings than in the second filter 123. The base air purifier 1 may operate close to a floor or ground surface, and a relatively large amount of dust on the floor of a room may be suctioned. Large dust particles or other foreign matter may be first filtered by the first filter 122, while finer particles may be filtered by the second filter 123.

The fan 124 may be provided at a downstream side (i.e., in front) of the first and second filters 122 and 123 to suction air through the first and second filters 122 and 123 and discharge filtered air out of the front of the base air purifier 1. The discharge portion 125 may be smaller than the suction portion 121 to increase a flow rate of discharged air and push dust off of the front of the base air purifier 1 and/or the floor in front of the first air purifier 1, enhancing satisfaction.

Figure 5:
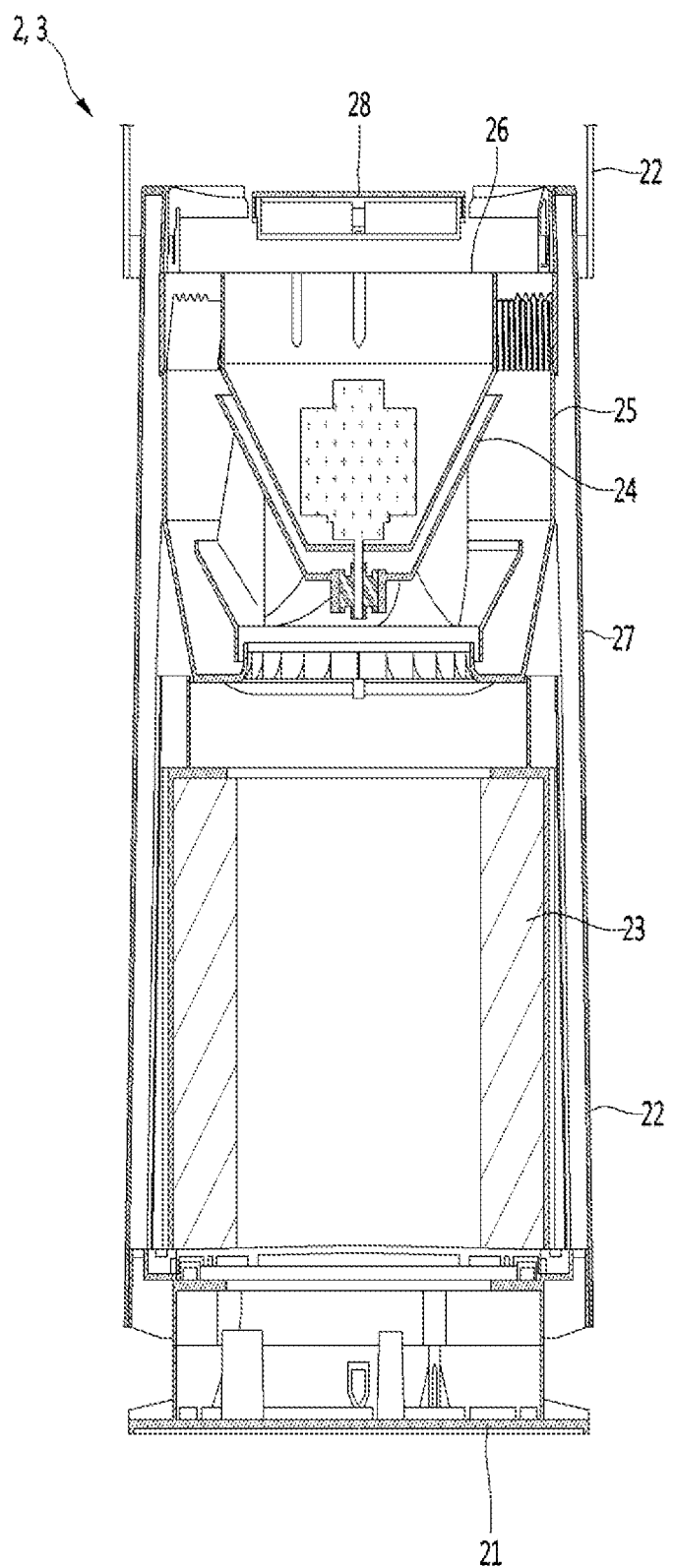
FIG. 5 is a schematic cross-sectional view of a portable air purifier.
Figure 6:
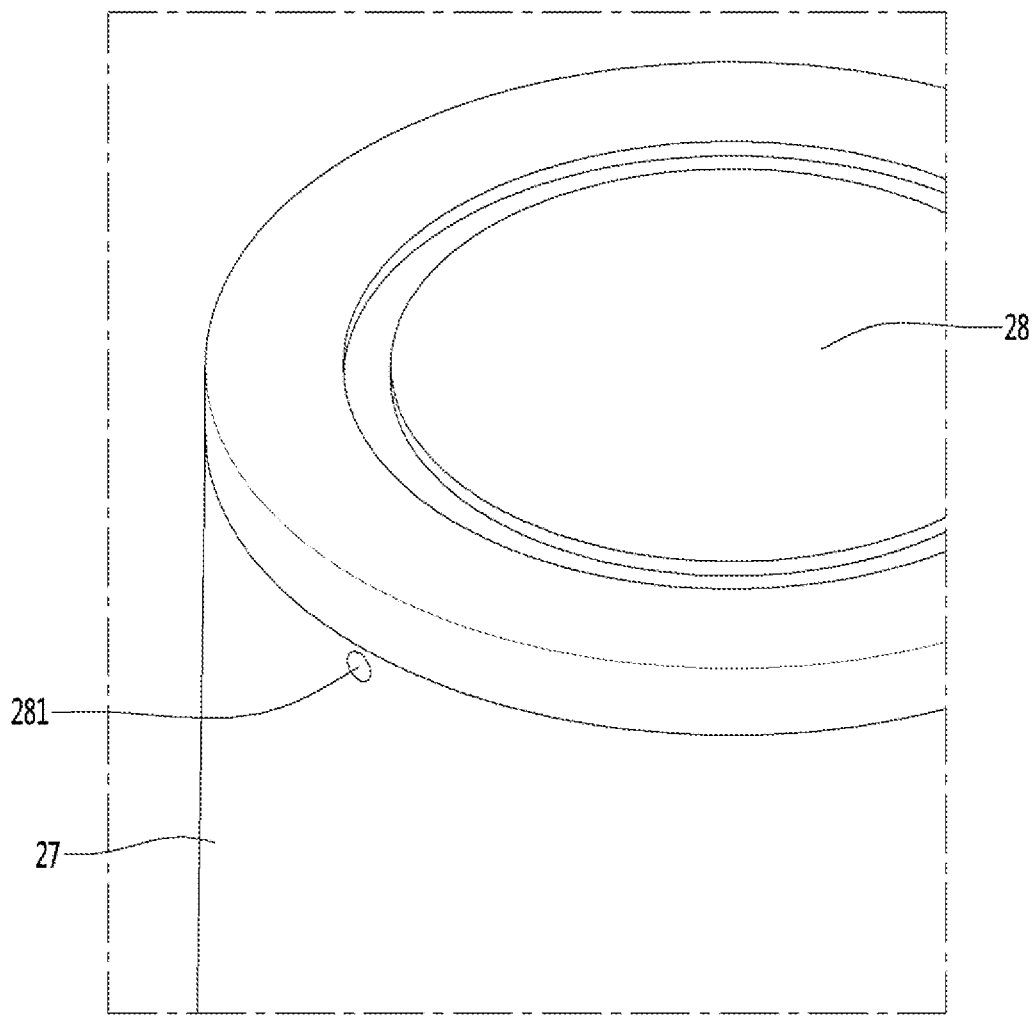
FIG. 6 is an enlarged view of a top of the portable air purifier.

Referring to FIGS. 5 and 6, the portable air purifiers 2 and 3 may each include an outer wall 27 forming an external appearance and/or outer surface. The outer wall 27 may be formed in a substantially cylindrical shell shape and may have a radius that slightly decreases from a bottom to a top to maintain a lower center of gravity. The outer wall 27 may define an inner space. The bottom of the portable air purifiers 2 and 3 may include a base 21 provided below the outer wall 27 and configured to be seated on the base air purifier 1.

A suction grill or port 22 having a plurality of holes may be formed in a bottom portion of the outer wall 27. A filter 23 may be provided in the inner space and may have a cylindrical shape corresponding to a shape of an inner contour of the outer wall 27. A fan 24 may be provided above the filter 23. The fan 24 may be provided in a fan housing 25 supported on top of the filter 23 and/or a filter frame supporting the filter 23. An air guide 26 may be provided above the fan 24 to adjust a direction of discharged air.

The fan 24 may suction air through the suction grill 22, the filter 23 may filter the suctioned air, and the air guide 26 may guide air discharged out of the fan 24 out of a discharge portion or grill, which may be provided at an upper side surface of the outer wall 27 and/or a top surface of the portable air purifier 2, 3. The air guide 26 may be a rotatable and/or inclinable vane that is configured to move (i.e., rotate, pivot, turn, or tilt) to change the direction of the discharged air. There may be a plurality of vanes to further adjust the flow of air. A motor may drive the air guide 26 so that an adjustment may be automatic.

A handle 22, 32 may be provided at an upper end of the outer wall 27 so that the user may easily carry the portable air purifier 2 or 3. A display 28 may be provided on an upper surface of the air guide 26. The display 28 may be implemented in a variety of modes or states, such as a first display mode indicating information (e.g., an operating status) of the portable air purifier 2, 3, a second display mode indicating information about the entire air purifying system (i.e., the base air purifier 1 and the portable air purifiers 2 and 3), and a third display mode indicating information about both the entire air purifying system and the individual portable air purifier 2, 3.

Five wireless transceivers 281 may be provided at an upper edge of the outer wall 27 of the portable air purifier 2 3. The wireless transceivers 281 may perform a same function as the wireless transceivers 111, 112, 113 of the base air purifier 1.

The wireless transceiver 281 may measure dimensions of an indoor space or room in which the portable air purifier 2, 3 is located. Alternatively or in addition thereto, the wireless transceivers 281 may also send and receive signals to and from the wireless transceivers 111, 112, and 113 of the base air purifier 1 and other remote sources (e.g., a robot cleaner described later) to communicate indoor space information and to create map information.

The air purifying system may be operated by using the map information detected by the base air purifier 1 and the portable air purifiers 2 and 3. The base air purifier 1 and the portable air purifiers 2 3 may cooperate together to perform an optimum cooperative operation of the air purifying system. The display 28 may indicate map information so that the user may intuitively know an operating state of the air purifying system.

Figure 7:
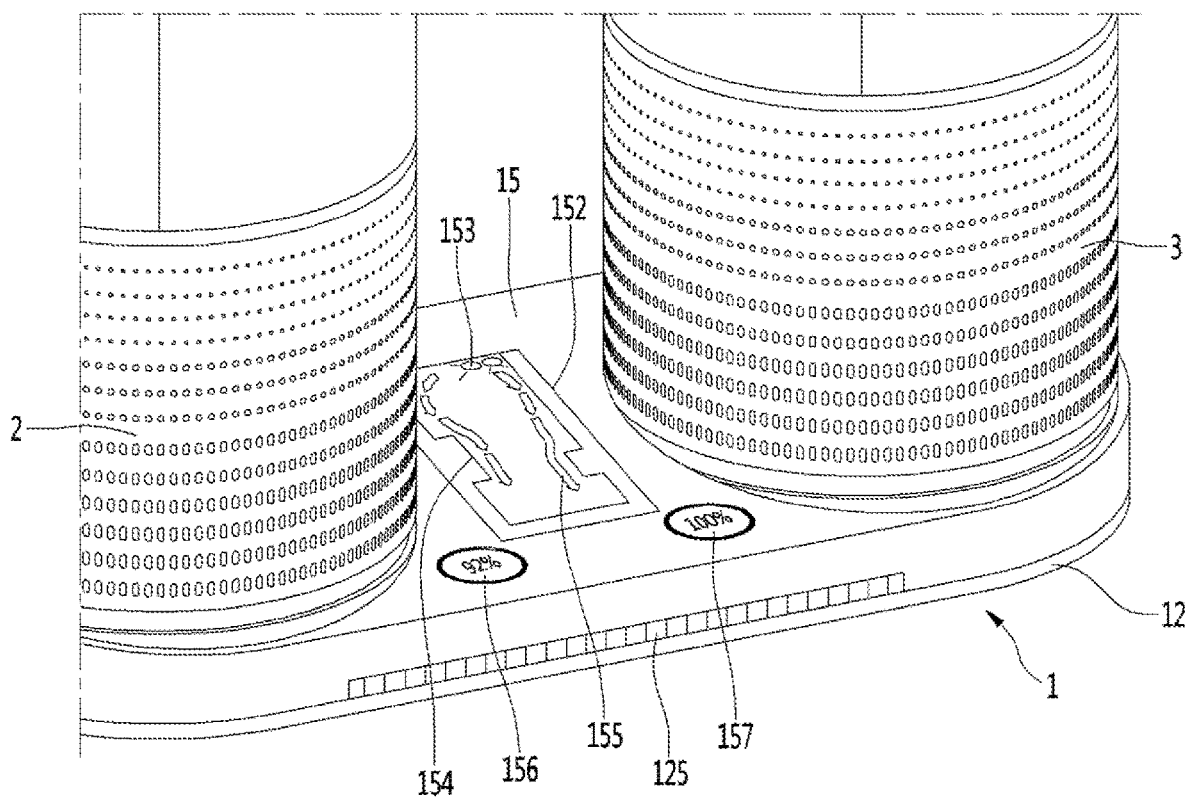
FIG. 7 is a view explaining an operation of the air purifying system.

Referring to FIG. 7, the portable air purifier 2, 3 may be seated on the base air purifier 1. The inclined surface 15 of the base air purifier 1 may include a display 152. The display 152 may be implemented in first, second, and third display modes, where the first display mode indicates information about the base air purifier 1, the second display mode indicates information about the entire air purifying system, and the third display mode indicates information about both the base air purifier 1 and the entire air purifying system. Alternatively, the display 152 may be configured to only be operated in the second display mode.

Figure 8:
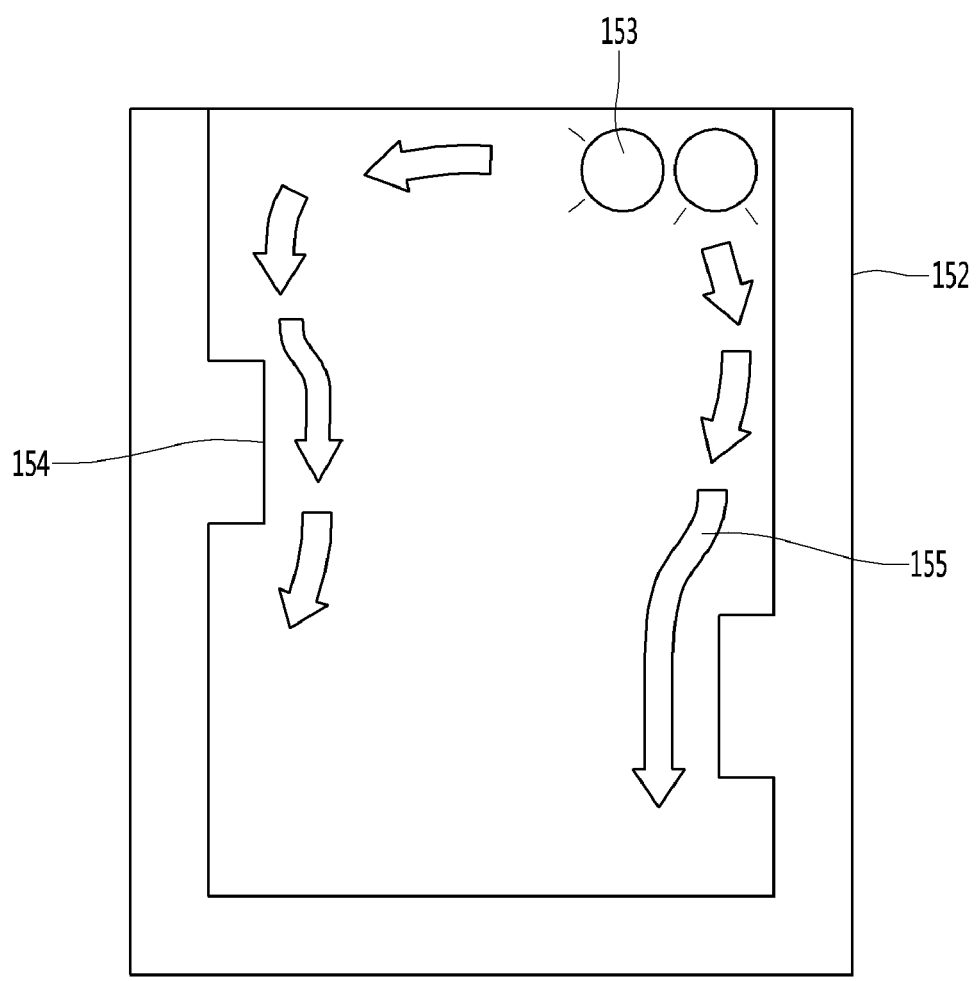
FIG. 8 is an enlarged view of a display of the main air purifier.

As exemplified in FIG. 8, the display 152 may display boundary information 154, location information 153, and air flow information 155. The boundary information 154 may indicate physical boundaries of the room or indoor space based on the map information captured by the wireless transceivers. The location information 153 may indicate a position of the base air purifier 1 and/or the portable air purifiers 2, 3 relative to the boundary information 154.

The air flow information 155 may indicate a direction, volume, and air quality of discharged air in a current operating state of the entire air purifying system. The base air purifier 1 and/or the portable air purifiers 2, 3 may include air quality sensors and/or receive air quality information from remote air quality sensors or other data from remote devices. The direction may be indicated by an arrow, the volume may be indicated by a thickness of the arrow, the speed may be indicated by a length of the arrow, and the air quality may be indicated by a color of the arrow. For example, an arrow may point in a direction of the air flow. As a volume of the air flow is increased, a thickness of the arrow is increased. As a speed of the air flow is increased, a length of the arrow may be increased. The arrow may appear more red if the air quality is bad (or as a contamination degree is increased) and may appear more green if the air quality is good (or as a contamination degree is reduced). Yellow may indicate a medium amount of contamination or a middle air quality. The inclined surface 15 may also include display modules 156 and 157 provided in front of the display 152. The display modules 156 and 157 may indicate charge information of the first and second portable air purifiers 2 and 3, respectively.

The cooperative operation may be based on a desired discharge direction of clean air from the air purifying system. As exemplified on the display 152 in FIG. 8, discharged air may circulate along a concave space or curvature of the indoor space shown by the boundary line information 154. The first portable air purifier 2, represented by the left circle of the location information 153, may blow clean air to the left, and the second portable air purifier 3, represented by the right circle of the location information 153, may blow clean air to the front when the second portable air purifier 3 is adjacent to a wall, represented by the right line in the boundary information 154. A direction of the discharged air may be controlled by the air guide 26.

An advantage of the cooperative operation is that clean air may be directed to all walls or areas of the room even when the air purifying system is not placed in a center of the room. An air volume may be adjusted to reach far walls or corners. For example, in the configuration represented in FIG. 8, the first portable air purifier 2 may be operated to increase a volume of discharged air (by, for example, increasing a rotation speed of the fan 24).

At least two air purifiers may be implemented in the cooperative operation. An operation of each of the air purifiers 1, 2, and 3 may be automatic based on the map information, air quality information, and position information of the air purifiers 1, 2, and 3. The user need not know a structure or design of the indoor space, as the air purifiers 1, 2, and 3 may obtain map information. It should be noted that the above-described cooperative operation is clearly distinguished from an operation in which a plurality of air purifiers are simply operated together.

Figure 9:
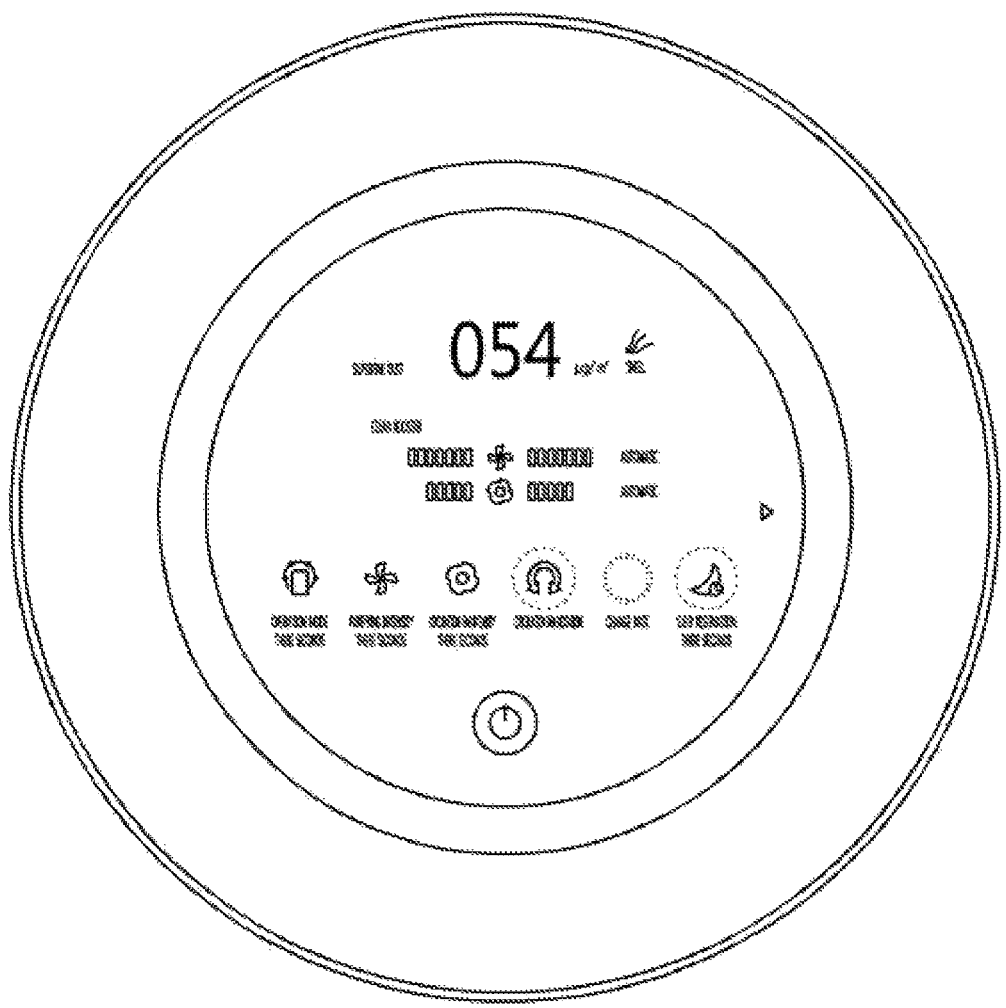
FIG. 9 shows a display of a portable air purifier.

Referring to FIG. 9, a current operating state of a portable air purifier 2, 3 may be indicated by the display 28 when the display 28 is implemented in the first display mode. The display 28 may display various operating states of the portable air purifier 2, 3, and may include a user interface (e.g., buttons or a touch screen) so that a user may select between the various operating states. One of the buttons on the display 28 may be a 'space learning' button. The user may press the space learning button to instruct the portable air purifier 2, 3 to perform special learning by obtaining the map information about the indoor space or room where the portable air purifier 2, 3 is currently placed.

When spatial learning is performed, dimensions of the indoor space may be measured via the wireless transceiver 281, data may be acquired, stored, and/or exchanged with other transceivers to create map information, and clean air may be discharged based on the map information.

Spatial learning may be performed not only in the cooperative operation but also in a single or independent operation of the portable air purifier 2, 3. For example, if the portable air purifier 2, 3 is positioned by itself in a corner of a room, the portable air purifier 2, 3 may be controlled to discharge clean air by rotating the air guide 26 only 90 degrees or other angle corresponding to an angle of the corner so as not to use unnecessary time or power discharging air toward a wall.

The display 28 may display a driving or operating state of only the portable air purifier 2, 3 to which the display 28 belongs in the first display mode. In the third display mode, the display 28 may display the boundary information 154 or the air flow information 155 in one area of the display 28 together with the current operating state of the portable air purifier 2, 3 in another area of the display 28.

Figure 10:
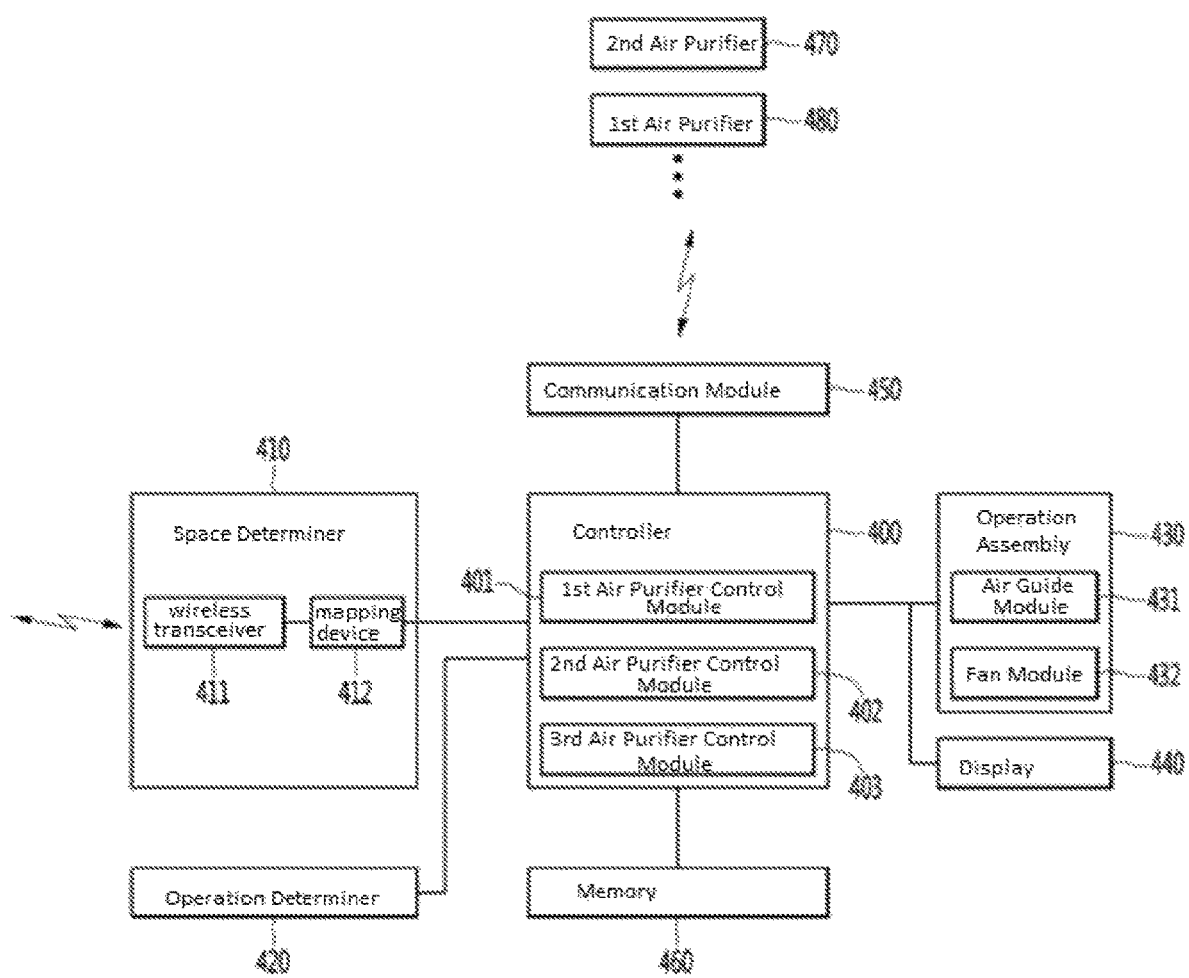
FIG. 10 is a system block diagram of an air purifying system.

Referring to FIG. 10, different reference numbers may be used for components previously described in FIGS. 1-10. For example, the first portable air purifier 2 is designated as 480 in FIG. 10.

The air purifying system may include a first air purifier 480, a second air purifier 470, and a third air purifier having a controller 400. The first and second air purifiers 480 and 470 may be implemented as previously described first and second portable air purifiers 2 and 3, and the third air purifier having controller 400 may be implemented as the base air purifier 1. The air purifying system may be placed in an indoor space.

The third air purifier may have a communication module 450 that communicates with the first and second air purifiers 480 and 470, a space or boundary determiner or detector 410 for obtaining map information of the indoor space, an operation determiner 420 to determine how the air purifying system should be controlled based on the map information, a driving or operating assembly 430 that is controlled based on a determination of the operation determiner 420, a display 440, and a memory 460. The space determiner 410 may also be referred to as a boundary or peripheral space determiner or detector. The operation determiner 420 may also be referred to as an operation decision generator or an operation mode selector.

The space determiner 410 may include at least one wireless transceiver 411 and a mapping device or module 412. The wireless transceiver 411 may be implemented as wireless transceiver 111 of the base air purifier 1. The mapping device 412 may be a block including a mapping processor to generate map information of the indoor space based on a transmission/reception signal of the wireless transceiver 411.

The operation determiner 420 may determine an operation mode or a desired operation for the current indoor space based on the map information provided from the mapping device 412. Alternatively or in addition thereto, the operation determiner 420 may determine the operation mode based on air quality data in the indoor room. The operation determiner 420 may determine an overall desired direction, volume, and speed of discharged air in the indoor space and may operate the driving assembly 430 to implement the desired air flow for the current indoor space. Alternatively or in addition thereto, the operation determiner 420 may also determine how the first and second air purifiers 480 and 470 should be operated, and information regarding a desired direction, volume, and speed from each of the first and second air purifiers 480 and 470 may be communicated via the communication module 450. The operation determiner 420 may be configured to determine desired operations in a way that maximizes a disbursement of clean air in the indoor space and/or maximizes an air quality condition of the indoor space, but embodiments disclosed herein are not limited hereto.

As an example, when the third air purifier is placed in a 90 degree corner formed by walls of a square indoor space, the operation determiner 420 may determine that air should be discharged from the third air purifier at a 45 degree angle from a wall toward along a center line of the corner, and the driving assembly 430 may be controlled so as to discharge air of the air purifier accordingly (e.g., an air guide may be controlled via an additional driving assembly or module 431 to orient air in the desired direction or a fan may be controlled via the fan module 432 to increase a speed). As another example, the air guide of the third air purifier may be configured to rotate within the corner to evenly disperse discharged air along an arc corresponding to the 90 degree corner.

The controller 400 may determine operating conditions of the first and second air purifiers 480 and 470, along with operation conditions of the third air purifier, using various information stored in the memory 460. The controller 400 may be provided with first, second, and third air purifier control modules 401, 402, and 403. The first, second, and third air purifier control modules 401, 402, and 403 may determine the operating conditions of the first, second, and third air purifiers, respectively, by checking the location and installation conditions or orientations of the air purifiers associated with each control module.

The space determiner 420 may determine that it is desirable to provide clean air in a desired direction. For example, in the boundary and location information 154 and 153 represented in FIG. 8, the space determiner 420 may determine that air from the second air purifier 2 should be directed forward and rightward. A reference of the direction may be based on the front of the base air purifier 1 and/or based on the installation orientation of the second air purifier 2. When the base 1 is not also an air purifier, air flow volumes, directions, and speeds implemented by the portable air purifiers 2 and 3 may be different than when the base 1 is also an air purifier. When the operating conditions of the three air purifiers are determined via the control modules 401, 402, and 403, the controller 400 of the third air purifier may send a signal to the driving assembly 430 to operate the third air purifier accordingly and may transmit a control signal to the first and second air purifiers 480 and 470 through the communication module 450. The first and second air purifiers 480 and 470 may also include communication modules to communicate with each other and the third air purifier.

The operation assembly 430 may include a first or fan driving assembly or module 432 and a second or additional driving assembly or module 431. The additional driving assembly 431 may be configured to drive the air guide 26, and may also be referred to as an air guide driving assembly or air guide module.

The controller 400 may output an operation status through the display 440 so that the user may confirm the operation status. The mode of the display unit 440 may be selected in advance among the first, second, and third display modes.

Although FIG. 10 exemplifies an air purifying system where one air purifier is a main or master air purifier having a controller 400 and two other air purifiers 480 and 470 are secondary or portable air purifiers, embodiments disclosed herein are not limited to such control configurations. For example, when the base air purifier 1 is not suitable for installing wireless transceiver 111, a wireless transceiver 281 may be installed in the portable air purifier 2, 3 to measure dimensions of the indoor space. The information measured by the wireless transceiver 281 may be transmitted to the base air purifier 1 before or after being processed by the mapping device 412 as the mapping information. As another example, one of the portable air purifiers 2, 3 may have the controller 400 and serve as a master air purifier.

As another example, the space determiner 420 may alternatively be provided in at least one of the first or second air purifiers 480 and 470. However, The control modules 401, 402, and 403 may be provided only in their respective air purifiers so that each of the first, second, and third air purifiers may be individually controlled and operated.

Figure 11:
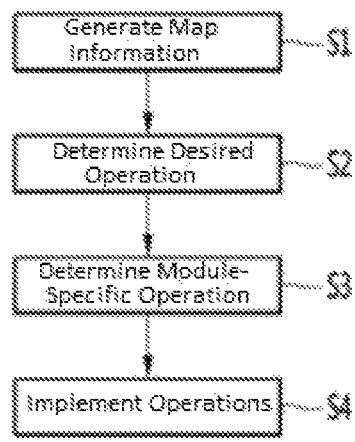
FIG. 11 is a flow chart for explaining a control method of the air purifying system.

Referring to FIG. 11, a control method will be described. First, map information may be acquired or generated (S1). As previously described, the map information may correspond to boundary and other space information of an indoor space in which the air purifying system is placed, which may be obtained by a wireless transceiver. A mapping device may generate the map information based on information obtained by the wireless transceiver.

Thereafter, a desired operation or operation mode is determined using the map information and other resources (e.g., air quality information) of the air purifying system (S2). As previously described, the operation may be determined by the operation determiner based on operating conditions, orientations, positions, and map information of the air purifiers of the current air purifying system. The desired operation may implement desired orientations of the air guides, a movement of the air guides, and a desired rotation of the fans based on a desired air volume, flow direction, and speed.

The desired operation may be a cooperative operation. The cooperative operation may be a final operation result when at least two air purifiers provided in the air purifying system are operated together. A determination of the cooperative operation may refer to a resultant sum of discharged air from the air purifier operations by operating together in the indoor space at current locations.

Module-specific operation information may be determined and provided to the individual air purifiers (S3). The module-specific operation may be determined and/or calculated based on the desired and/or cooperative operation determined in step S2. In the case of FIG. 8, module-specific information may be information instructing the first portable air purifier to blow clean air toward the left and the second portable air purifier to blow clean air forward. However, in the case of FIG. 8, it may alternatively be determined that both portable air purifiers and/or the base air purifier should blow together in an oblique right direction. Thereafter, respective control modules may perform or implement individual air purifying operations based on the module-specific operation information (S4).

Figure 12:
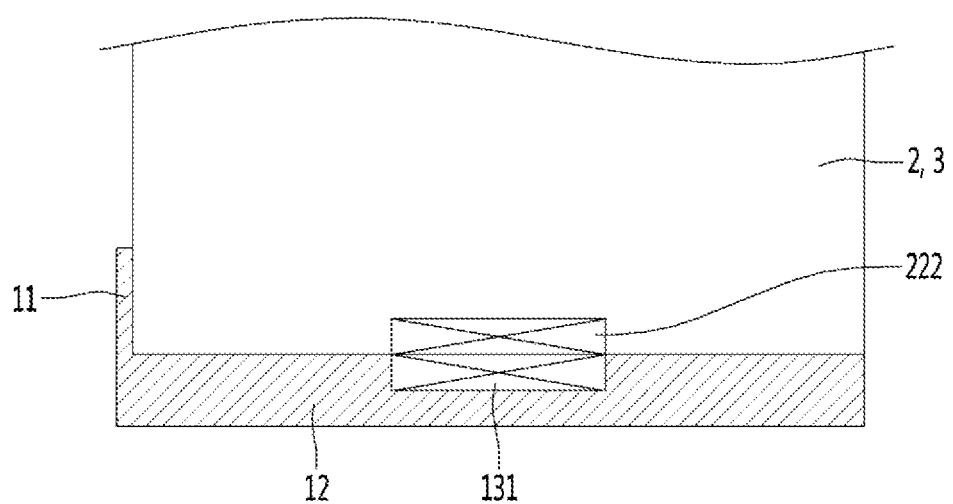
FIG. 12 is a cross-sectional view of a center portion of a seating groove to illustrate how the portable air purifier may be charged or powered by the main air purifier.

Referring to FIG. 12, a wireless charging module or transceiver 131 may be provided in an upper portion of the lower wall 12 so as to be provided under the bottom surface of each seating groove 12 and 13. There may be two wireless charging modules 131, one under each seating groove 12 and 13, or alternatively one large wireless charging module 131 that extends under both seating grooves 12 and 13. A wireless charging module or transceiver 222 may be provided in the base 21 of each portable air purifier 2, 3 at a position such that the wireless charging module 222 aligns with the wireless charging module 131 of the seating groove 13, 14 when the portable air purifier 2, 3 is seated in the seating groove 13, 14. The portable air purifiers 2 and 3 may each include a battery that is charged via a wireless power transfer (WPT) method implemented by an interaction (e.g., electromagnetic induction) between the wireless charging modules 131 and 222.

Figure 13:
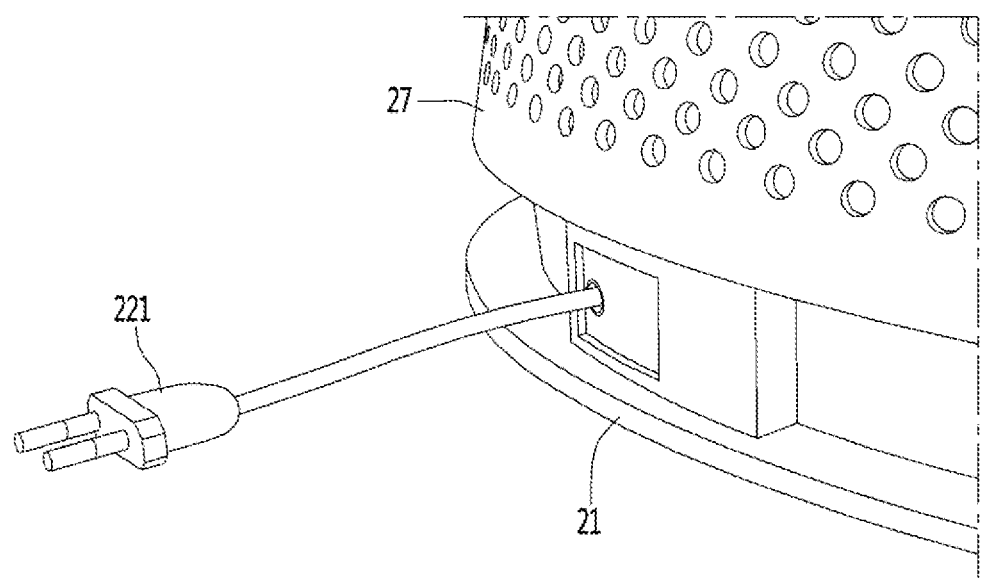
FIG. 13 is a partial rear view of the portable air purifier to show how the portable air purifier may be charged or powered by an external commercial power supply.
Figure 14:
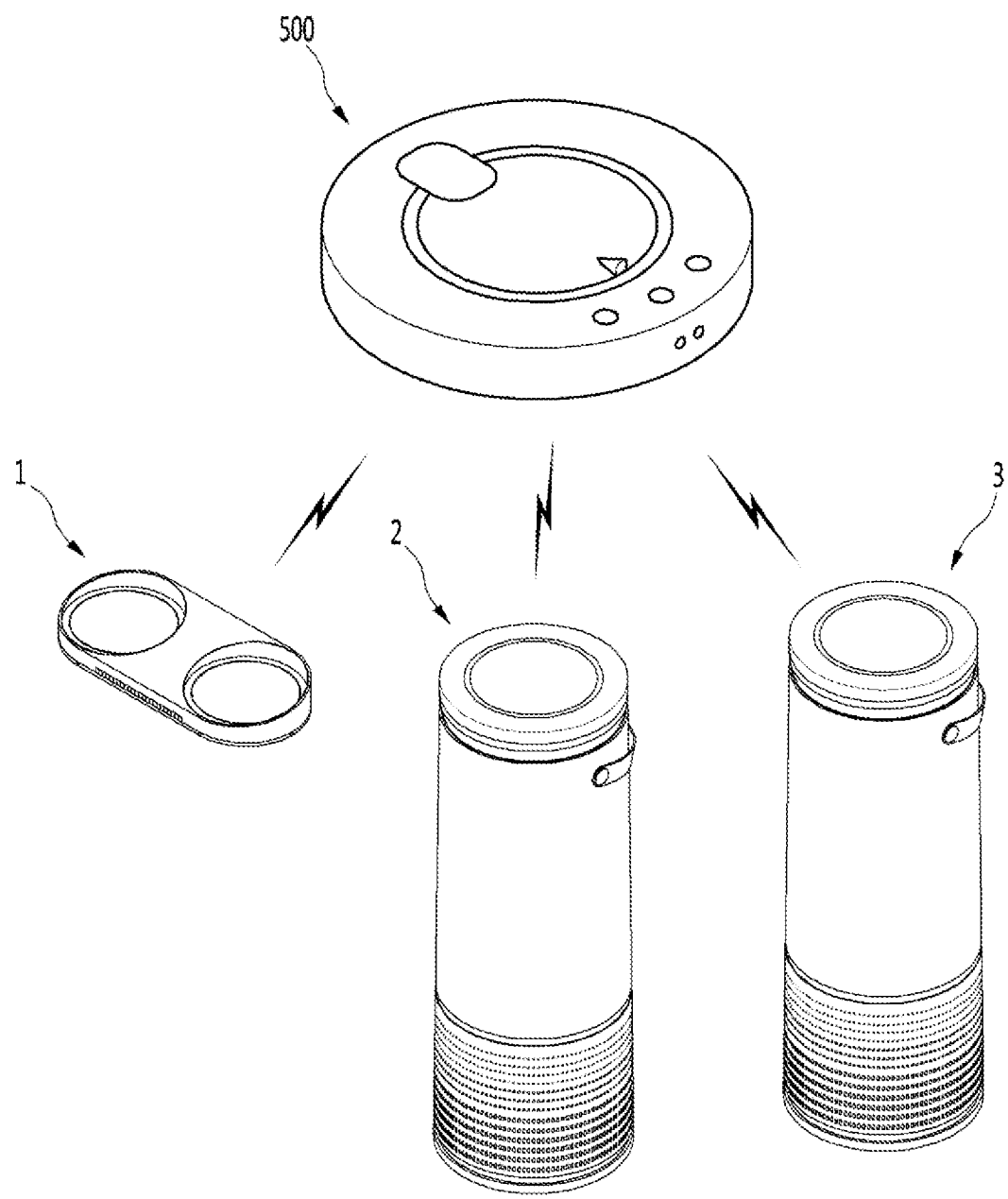
FIG. 14 is a view schematically showing a configuration of an air purifying system according to another embodiment.

Referring to FIG. 13, the base 21 of the portable air purifier 2, 3 may have a terminal or wire connecting to a plug 221 configured to plug into an external commercial power supply (e.g., a wall socket). The base 21 may include a space in which the wire or cable may be provided. The portable air purifier 2, 3 may receive power via a wired connection by the plug 221.

The portable air purifiers 2 and 3 may be wirelessly charged when placed on the base air purifier 1, and may be wire-charged when separated from the base air purifier 1. The base air purifier 1 may be configured to connect to an external commercial power supply by a plug similar to the plug 221 of the portable air purifiers 2, 3. Since the portable air purifiers 2, 3 may be plugged in, air purifying may be informed with little risk of running out of power.

In the case of the above embodiment described with reference to FIGS. 1-13, clean air may be supplied based on map information created by measurements from the base and portable air purifiers 1, 2, and 3. However, depending on positions of the wireless transceivers and/or how often the portable air purifiers 2 and 3, information may not be obtained where signals from the wireless transceivers can't reach, such as at back or side wall provided at an unusual angles or behind walls in different rooms. Even if map information is slowly acquired by moving the portable air purifiers 2, 3 around in the indoor space, it may be difficult to supply clean air based on comprehensive map information of the indoor space due to partitions created by walls and doors. On the other hand, it may not be necessary to supply clean air depending on a state of the room or how long a door has been opened or closed. For example, in the case of a room that may have been closed for a long time, it may not be necessary to incorporate information on that room in the map information, as clean air may not need to be supplied to that room.

Referring to 14, an air purifying system according to another embodiment may include a robot cleaner 500 in addition to the base and portable air purifiers 1, 2, and 3. The base and portable air purifiers 1, 2, and 3 may be substantially similar to the base and portable air purifiers 1, 2, and 3 described with reference to FIGS. 1-13. The robot cleaner 500 may be a moving vacuum cleaner, or alternatively may be a moving air purifier. The robot cleaner 500 may obtain map information and/or dimensions of an indoor space and communicate such information to the base and portable air purifiers 1, 2, and 3 so that an operation of the air purifying system 1, 2, 3 may be better or more accurately suited to the indoor space.

The robot cleaner 500 may obtain the map information by determining a structure and/or design of the indoor space during autonomous travel. The air purifiers 1, 2, and 3 may receive the map information in a state where the air purifiers 1, 2, and 3 are separated.

The map information acquired by the robot cleaner 500 may be transmitted to the base air purifier 1, and the base air purifier 1 may use the map information to determine an operation mode of the base air purifier 1 and also of the portable air purifiers 2 and 3. As described above with reference to FIG. 10, the base air purifier 1 may act as a main or master air purifier among the three air purifiers 1, 2, and 3, but embodiments disclosed are not limited thereto.

The air purifiers 1, 2, and 3, which have obtained the map information, may be operated according to a determined cooperative operation. When determining the cooperative operation, desired positions for each air purifier 1, 2, and 3 may also be determined and communicated to the user.

The robot cleaner 500 may travel around an entire indoor or residential space and may vacuum or purify in real time. The current map information of the indoor space may be acquired during cleaning. The robot cleaner 500 and/or the main air purifier 1 may determine where clean air needs to be supplied at the present time, and a discharge of air of the air purifiers 1, 2, 3 may be controlled accordingly. When the air purifiers are operated based on current map information, an air purifying function of the air purifying system may be optimized to more efficiently supply clean air throughout the indoor space.

A space that may not require a supply of clean air, such as a storage room or old closet, may not be included in the current map information if the robot cleaner 500 does not travel to such a room. Therefore, more clean air may be directed to spaces that are frequently used and not unnecessarily directed to rooms that are not used as frequently.

Figure 15:
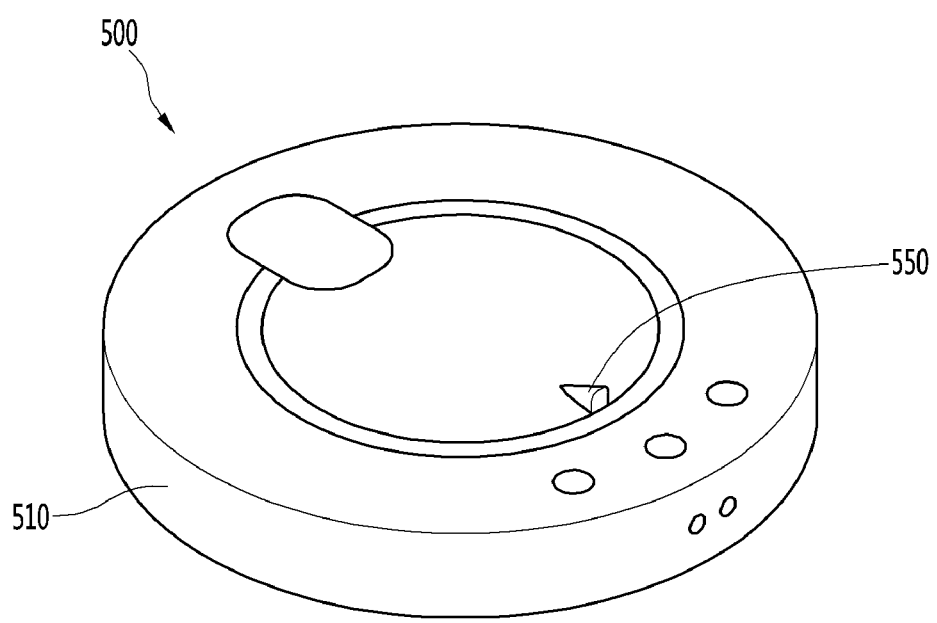
FIG. 15 is a perspective view of a robot cleaner.
Figure 16:
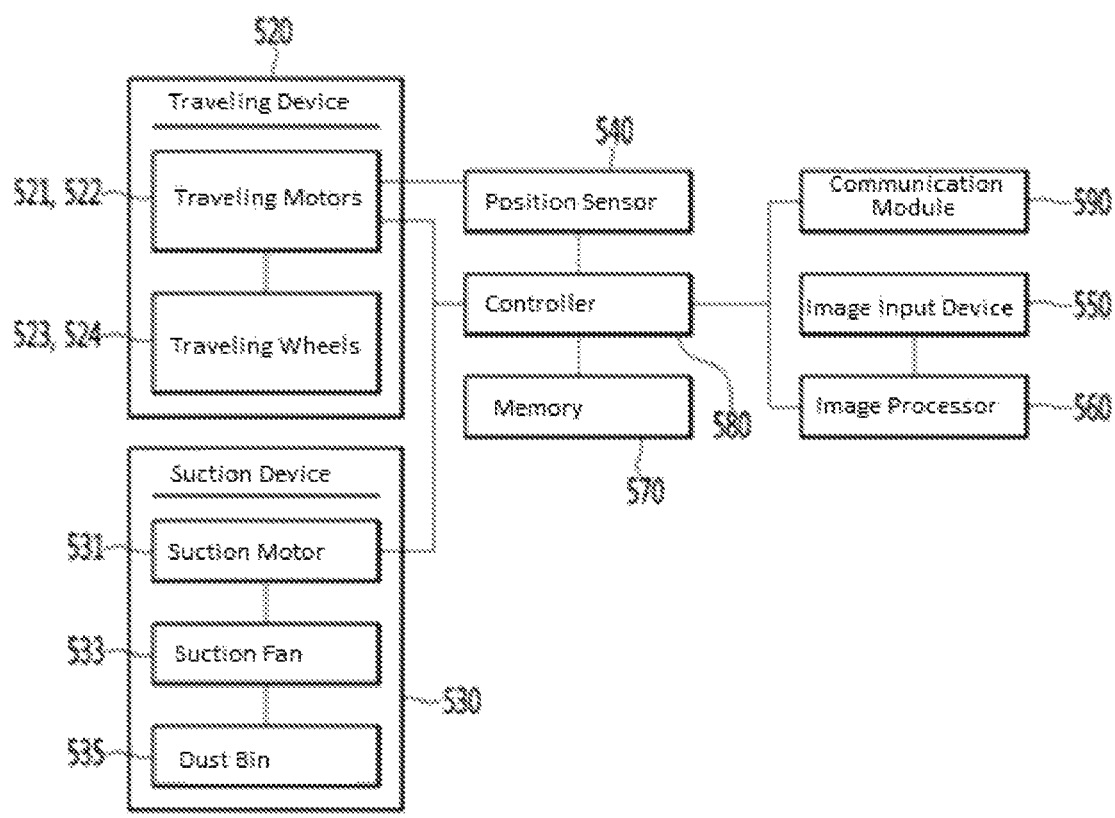
FIG. 16 is a block diagram of the robot cleaner.

Referring to FIGS. 15 and 16, the robot cleaner 500 may perform a vacuum cleaning operation while traveling in a predetermined cleaning area. The robot cleaner 500 may include a casing or frame 510, a traveling device 520 (e.g., a wheel assembly), a suction device 530, a position sensor, an image input or capturing device 550 (e.g., camera), an image processor 560, a storage or memory 570, a controller 580, and a communication module 590. The image input device 550 may include a position sensor or alternatively be implemented as a position sensor (e.g., laser sensor) without an image input device.

The casing 510 may form an appearance and/or outer surface of the robot cleaner 500. The traveling device 520, the suction device 530, the position sensor 540, the image input device 550, the image processor 560, the memory 570, and the control controller 580 may be provided on or inside the casing 510.

The traveling device 520 may provide a driving force to move the robot cleaner 500. The traveling device 520 may include traveling wheels 523 and 524 rotated by traveling motors 521 and 522. The traveling motors 521 and 522 may include a first traveling motor 521 and a second traveling motor 521 and 522 controlled independently of each other. The traveling wheels 523 and 524 may include a first traveling wheel 523 and a second traveling wheel 524 connected to the first and second traveling motors 521 and 522, respectively. A traveling direction and a speed of the robot cleaner 500 may be adjusted by adjusting a rotational direction and/or the rotational speed of the first and second traveling motors 521 and 522.

The suction device 530 may provide a driving force or pressure to suction foreign substances into the casing 510. The suction device 530 may include a suction motor 531, a suction fan 533 rotated by the suction motor 531, and a dust collecting member or bin 535 to collect foreign substances suctioned into the inside of the casing 101.

The position sensor 540 may sense a positional variation caused by a movement of the robot cleaner 500 and sense or calculate how far the robot cleaner 500 has moved with respect to an initial position. The position sensor 540 may include an encoder to detect a number of revolutions of the first and second traveling motors 521 and 522 to calculate a movement amount of the robot cleaner 500.

The image input device 550 may be installed at one side of the casing 510. As an example, the image input device 550 may be installed at a front side of the casing 510 and oriented toward a forward direction. The image input device 550 may capture or input an image of a cleaning area corresponding to a forward direction of the robot cleaner 500. The image input device 550 may be implemented as a camera that captures an image or video.

The image processor 560 may process an image input by the image input device 550 and extract feature points or minutiae from the image. For example, when the image input by the image input device 550 is converted into a frequency domain, a corner portion, which may be a region where a variation width of the frequency is relatively large, may be extracted as a feature point.

The feature point extracted by the image processor 560 and the position information of the robot cleaner 500 detected by the position sensor 540 may be stored in the memory 570. As will be described later, the memory 570 may store a map created by the controller 580 and various other information for operation of the robot cleaner 500. The memory 570 may be a non-volatile memory, and the above-described information may be stored in the memory 570 regardless of whether power supplied to the robot cleaner 500 is turned on or off.

The controller 580 may control the operation of the robot cleaner 500 (i.e., operations of the traveling device 520, the suction device 530, the image input device 550, the position sensor 540, the memory 570, the image processor 560, and the communication module 590). The controller 580 may generate a map of a region where the robot cleaner 500 performs a cleaning, that is, a cleaning area or region.

When the cleaning area is divided into a plurality of areas or zones, the controller 580 may create an individual map for each zone and also create an overall map for the entire cleaning area.

The controller 580 may store the generated map of the cleaning area in the memory 70. The controller 580 may control an operation of the robot cleaner 500 to perform a cleaning operation for each of the zones or the entire cleaning area based on the created map.

The controller 580 may control the robot cleaner 500 based on the feature points extracted from the image input by the image input device 550 and the position of the robot cleaner 500 detected by the position sensor 540. By matching the common feature points on the maps of the areas adjacent to each other using the input images, a map of the entire cleaning area may be created.

The controller 580 may correct the created map when the initial position of the robot cleaner 500 is changed and may control an operation of the robot cleaner 500 based on the corrected map so that the entire cleaning area and/or the zones are efficiently cleaned.

The controller 580 may determine that some areas may be non-infected areas that should be excluded from the cleaning area to which the robot cleaner 500 should travel. Accordingly, the map information of the indoor space may be changed. The changed map information may be transmitted to the air purifiers 1, 2 and 3 and may be utilized for operation of the air purifiers 1, 2, and 3.

Figure 17:
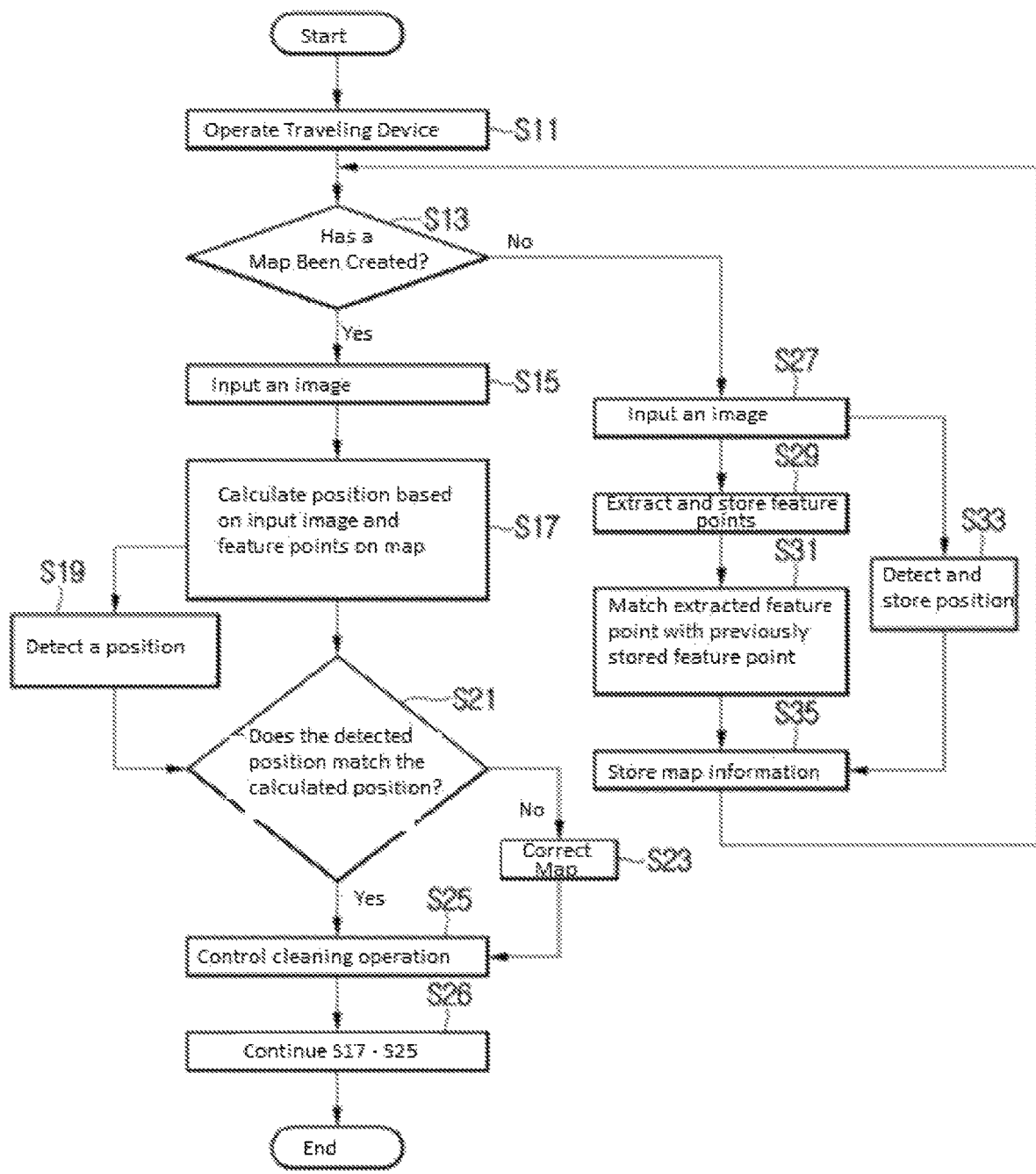
FIG. 17 is a flowchart explaining a control of the robot cleaner.
Figure 18:
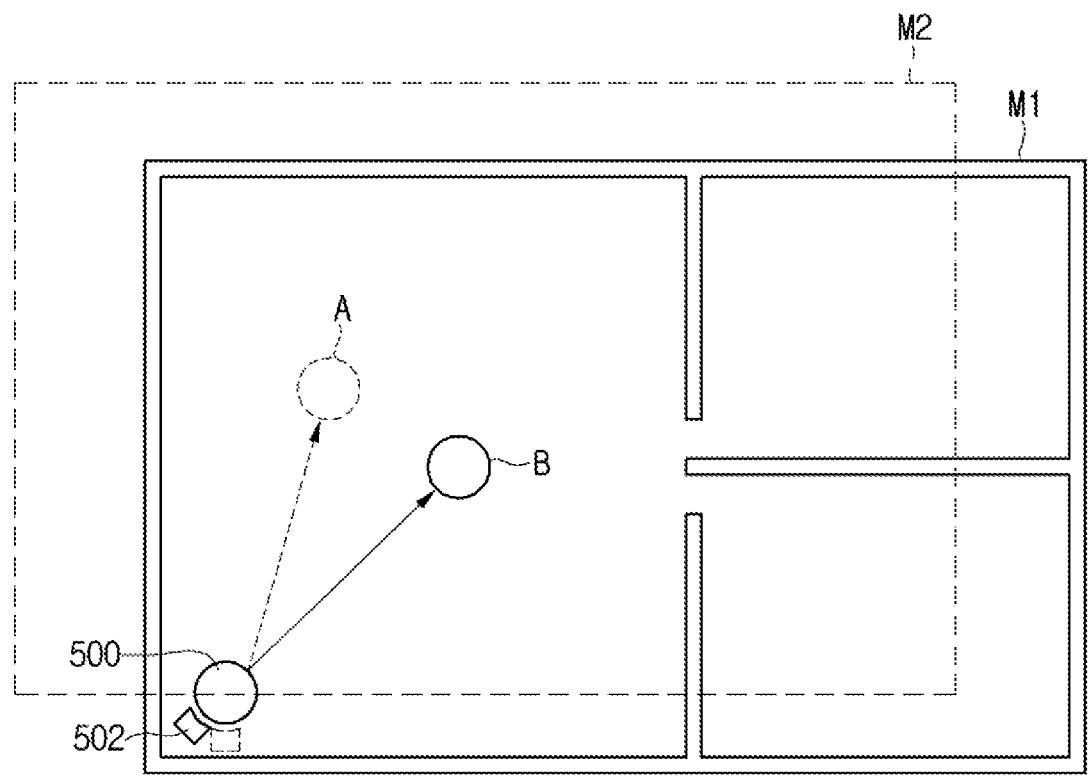
FIG. 18 is a diagram explaining a map correction by the robot cleaner.

Referring to FIGS. 16-18, the traveling device 520 may operate to start moving the robot cleaner 500 (S11). When the robot cleaner 500 moves, the controller 580 may determine whether a map is stored in the memory 570, indicating that a map has been created (S13).

If it is determined in step S13 that a map is stored in the memory 570, the image input device 550 inputs an image (S15). Then, the controller 580 calculates a position of the robot cleaner 500 on the map (S17). Such a position may be referred to as an image or calculated position. A calculation of the position of the robot cleaner 500 in step S17 may be performed by matching the feature points extracted by the image input by the image input device 550 in step S15 and the feature points on the map stored in the memory 570. The image input device 550 may continuously input images as the robot cleaner 500 moves.

The position sensor 540 may calculate an initial position based on a previous position of the robot cleaner 500 before the cleaning operation was started. The initial position may be a position of the robot cleaner 500 a significant time after a previous cleaning operation or a position of a docking station or charging dock 502 at which the robot cleaner 500 is stored. As the robot cleaner 500 moves, the position sensor 540 may detect a position of the robot cleaner 500 (S19) based on a movement amount of the robot cleaner 500 relative to an initial position. The position sensor 540 may detect an operation of the traveling device 520 to detect a movement amount. The position of the robot cleaner 500 detected by the position sensor 540 in step S19 may be referred to as a detected position of the robot cleaner 500.

The controller 580 may compare the position of the robot cleaner 500 calculated in step S17 with the current position of the robot cleaner 500 detected in step S19 and determine whether the two positions are identical (S21). If the robot cleaner 500 has moved, the positions calculated in step S17 and step S19 may be different from each other.

For example, when the position or orientation angle of the docking station 502 changes, the initial position of the docked robot cleaner 500 may be substantially changed. A position A of the robot cleaner 500 on the map calculated by the controller 580 may be different from the position B of the robot cleaner 500 currently detected by the position sensor 540.

If the controller 580 determines in step S21 that the calculated value of the position of the robot cleaner 500 is different from the detected value, the controller 580 may correct the previously created map (S23). The correction of the map in step S21 may be performed by comparing the position of the robot cleaner 500 calculated by the controller 580 in step S17 with the position of the robot cleaner 500 detected by the position sensor 540 in step S19. The map data may be corrected to match the positions of the map data. For example, as shown in FIG. 18, the controller 580 may move a previously created map M1 on a virtual X-Y coordinate plane and correct it to a new map M2. Steps 17-23 may be continuously performed as the robot cleaner 500 moves so that the map may be continuously corrected.

Next, the controller 580 may control a cleaning operation of the robot cleaner 500 (S25). If it is determined in step S21 that the calculated value of the position of the robot cleaner 500 matches the detected value, the controller 580 stores the map stored in the memory 570 and controls the cleaning operation of the robot cleaner 500. The robot cleaner 500 may continuously calculate and detect a position to continuously correct map information (S26).

If it is determined in step S21 that the calculated value and the detected value of the position of the robot cleaner 500 are different from each other, the controller 580 may control the cleaning operation of the robot cleaner 500 based on the map information corrected in step S23. The robot cleaner 500 may clean while traveling in a cleaning area. The created map may be stored in the memory 570 as current map information.

If, in step S13, the controller 580 determines that a map is not stored in the memory 570, a map may be created. First, the image input device 550 may input an image (S27). The image processor 560 may extract feature points from the image input by the image input device 550 and store the extracted feature points in the memory 570 (S29). The controller 580 may match a feature point extracted from the current image with a feature point previously stored in the memory 570 (S31), and store a position of the robot cleaner 500 detected by the position sensor 540 of the robot cleaner 500 (S33). The created map may be stored in the memory 570 as current map information (S35).

The current map information may be transmitted to all or some of the air purifiers 1, 2, and/or 3 or alternatively only to the base air purifier 1 through the communication module 590. The base air purifier 1 may operate the portable air purifiers 2 and 3 by utilizing the current map information.

The current map information may be directly transmitted to the air purifiers 1, 2 and 3 while the robot cleaner 500 performs purifying so that the map information may be updated more quickly. In addition, the current map information may be transmitted to the air purifiers 1, 2 and 3 before and after the robot cleaner 500 performs cleaning so that current map information may always be updated.

The current map information of the indoor space may be obtained by various methods other than the above-described method. Since the latest map information may be updated to the current map information through a simple correction process, the current map information may be obtained more conveniently and quickly.

The current map information may be transmitted to the base air purifier 1 at every operation of the robot cleaner 500 so that a design of the indoor space at a present time point may be more accurate. For example, a room that the robot cleaner 500 has not entered may be excluded from the current map information. As a result, the air purifying system may always perform an optimum or efficient air purifying action at the present time.

Figure 19:
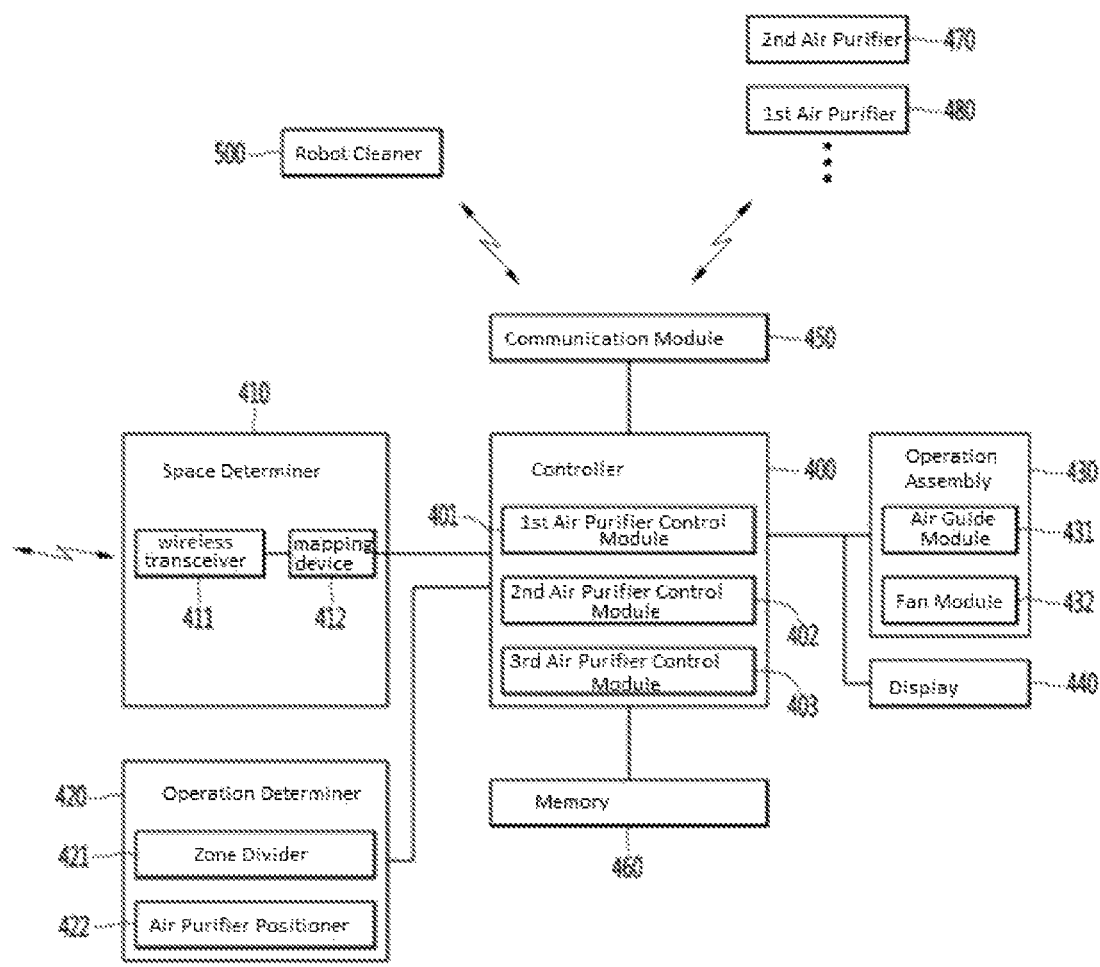
FIG. 19 shows a system configuration of an air purifying system according to another embodiment.

FIG. 19 may be substantially similar to FIG. 10 except for the addition of the robot cleaner 500. In addition, a configuration of the operation determiner 420 may be different. The below description will primarily focus on the different structure of the robot cleaner 500 and the different configuration of the operation determiner 420, while repetitive descriptions may be omitted The operation determiner 420 may refer to the current map information acquired by the robot cleaner 500 to determine an area where the air purifiers 1, 2, and 3 are located at a present time. The operation determiner 420 may include an area or zone division determining device or module 421 that may divide a desired area or residential space to be cleaned into zones or smaller areas and an air purifying positioning device or module to determine which air purifiers 1, 2, and/or 3 should occupy which zones during implementation of the cooperative operation. The zone division determining device 421 may be referred to as a zone divider.

A zone may be defined by walls and/or doors so that clean air discharged from an air purifier 1, 2, and/or 3 placed in one of the zones may not directly affect another zone. Even if a door is not closed, another zone may be set if a direction of the door is different from a direction of an air outlet or discharge port of the air purifier 1, 2, or 3.

The operation determiner 420 may refer to the current map information acquired by the robot cleaner 500 and determine an installation position and zone of each of the air purifiers 1, 2, and 3 via an air purifier positioning device 422. The display 440 may notify the user of determined locations of the air purifiers 1, 2, and 3 based on the map. The space determiner 420 may perform the cooperative operation according to the embodiment described with reference to FIG. 10. Alternatively or in addition thereto, the air purifier positioning device 422 may only determine a zone and installation position of the base air purifier 1. For example, by using map information obtained by the robot cleaner 500 in a state where all the doors of the indoor space are opened (a state which would be determined in FIG. 20, for example), the base air purifier 1 may notify the user via the display 440 of a desirable position of the base air purifier 1.

Figure 20:
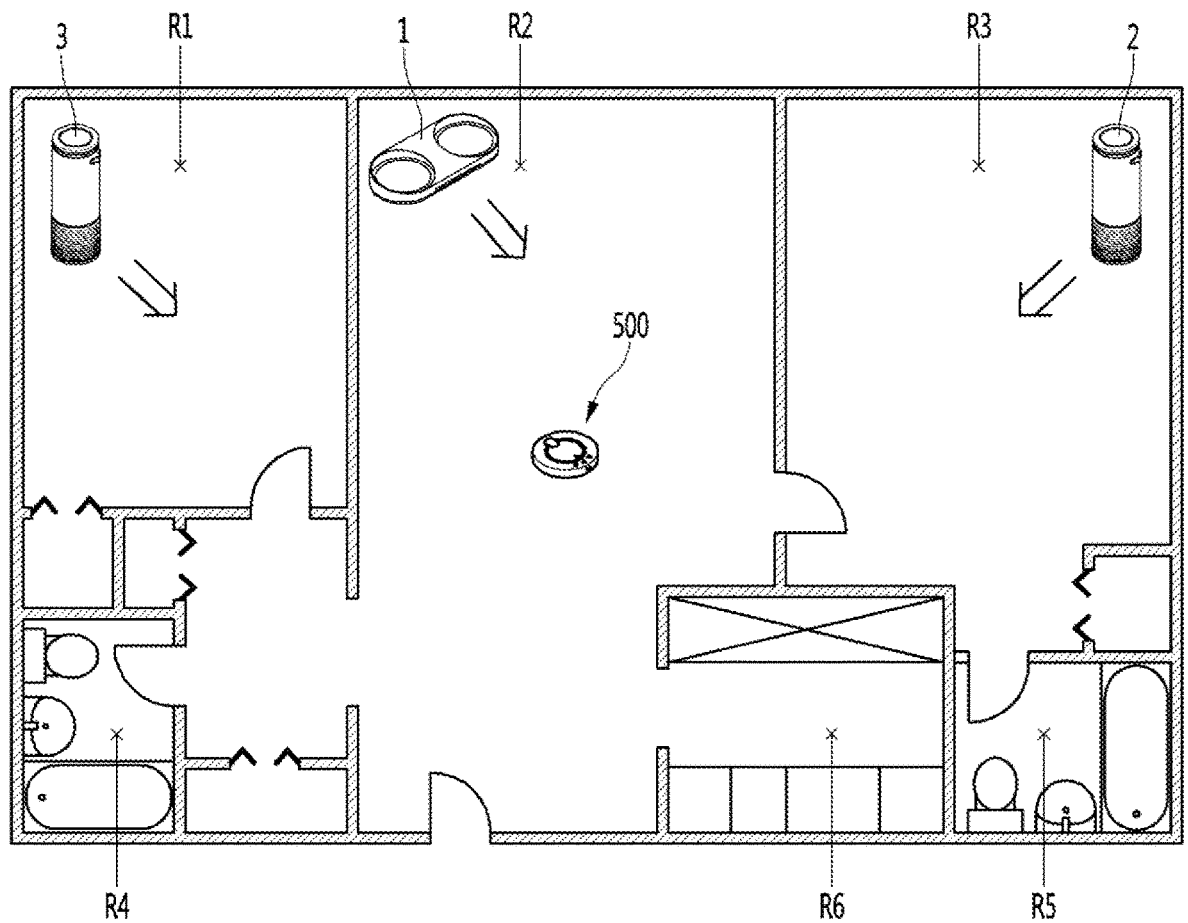
FIG. 20 is a reference diagram for explaining a determination of an operation of the air purifiers.

Referring to FIGS. 19 and 20, the zone determining device 421 may divide an interior space into six zones R1 to R6 according to current map information. The zone determining device 421 may determine that the zones R1 to R6 are open. In The zone determining device 421 may select three zones R1 to R3 that are large in area and interlinked with other zones.

The air purifier positioning device 422 may determine desired positions of each air purifier 1, 2, and 3 in the three selected zones R1 to R3, and may display the determination to the user via the display 440 so that the user may arrange each air purifier 1, 2, and 3 accordingly. The air purifier positioning device 422 may alternatively be referred to as an air purifier positioner. As an example, the image shown in FIG. 20 may be displayed on the display 400. According to a determination of the zone determining device 421, the user may set the base air purifier 1 in zone R2, the first portable air purifier 2 in zone R3, and the second portable air purifier 3 in zone R1 in accordance with an illustration shown on the display 440. According to a determination of the air purifier positioning device 422, the user may set the base air purifier 1 in the upper left corner of zone R2, the first portable air purifier 2 in the upper right corner of zone R3, and the second portable air purifier 3 in the upper left corner of zone R3 in accordance with an illustration shown on the display 440.

The operation determiner 420, when determining zones via the zone determine device 421 and positions via the air purifier positioning device 422, may factor in zone size, a connectivity or linkage (e.g., via doors) between the zones, a zone weight, and optionally air quality. A zone may be assigned to have a high connectivity when the zone is connected to many different zones via a door. A zone may be assigned a high weight when the zone is connected to several other zones by a wall. As a zone size, connectivity, and weight increases, a speed of a fan of an air purifier 1, 2, and/or 3 located in the zone may be increased, as such zones may require a higher air purifying capacity.

In the example of FIG. 20, an air flow direction may be determined to be diagonally toward a center in each zone R1, R2, and R3, as indicated by the arrows. The arrows may also be displayed on the display 440.

In another situation, one of the zones, for example zone R1, may be determined to be closed, and the current map information displayed on the display 440 may show the doors to zone R1 to be closed. In this case, the zone determining device 421 may determine that the second portable air purifier 3 should also be located in zone R2. The display 440 may display the base air purifier 1 and the second portable air purifier 3 in zone R2. The air purifier positioning device 422 may determine that a position of the second portable air purifier 3 in zone R2 should be separate from the base air purifier 1. For example, the second portable air purifier 3 may be determined to be placed at the upper right corner of zone R2 and the base air purifier 1 may be determined to be located at the upper left corner of zone R2. Such a determination may be displayed on the display 440. Thus, the air purifier positioning device 422 may determine where the air purifiers 1, 2, and 3 should be located within the zones R1 to R3.

The determinations by the zone determining device 421 and the air purifier positioning device 422 may promote a more uniform air flow and/or air quality throughout the indoor space and promote a more efficient air purifying function of the air purifying system. The zone determining device 421 and the air purifier positioning device 422 may be under the control of the controller 400.

Figure 21:
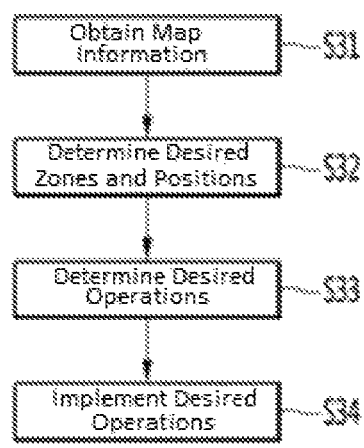
FIG. 21 explains a control method of the air purifying system according to an embodiment.

FIG. 21 may be similar to FIG. 11 except for the inclusion of the robot cleaner 500. Map information may be obtained from the robot cleaner 500 in a map information obtaining step S31. Zones in which the air purifiers 1, 2, and 3 should be located may be determined by the zone determining device 421 and positions and orientations of the air purifiers 1, 2, and 3 in their respective zones may be determined by the air purifier positioning device 422 in step S32. Module-specific operation information may be determined and provided to the individual air purifiers in step S33 in a manner substantially similar to step S3 of FIG. 11, and operations, controlling, and driving each air purifier 1, 2, and 3 in step S34 may be similar to step S4 of FIG. 11.

In step S31, current map information obtained by travel and operation of the robot cleaner 500 may be obtained. Map information of the indoor space may be obtained at a present time point. For example, a closed indoor space may not be included in the current map information, and the indoor space that is currently closed may not be a factor for determining a desired operation of the air purifying system.

In step S32, based on the current map information, zones in which each air purifier 1, 2, 3 should be located may be determined. Zone size, connectivity, and weight may also be factors in determining which air purifiers 1, 2, 3 should be placed in which zones. Thereafter, desired locations or positions of the air purifiers 1, 2, 3 in the determined zones may be determined. As an example, in the case of a square zone, it may be determined to place one air purifier (e.g., base air purifier 1) at one corner and another air purifier (e.g., first portable air purifier 2) at another corner. Determinations on the desired zones and locations may be displayed on the display 440 so that the user may arrange the air purifiers 1, 2, 3 according to the determinations. The cooperative operation and/or independent operations may be implemented according to the embodiment described with reference to FIG. 11.

Embodiments disclosed herein may perform various air cleaning or purifying operations corresponding or customized to an indoor space by using a single air purifying system provided with a plurality of air purifiers. An industrial application may be highly expected. Embodiments disclosed herein may operate an air purifying system in response to a real-time change of an indoor space, and in particular, a best operating method may be determined and suggested to a user. Three air purifiers may be modularized in the air purifying system, and operating conditions for the three air purifiers for a cooperative operation may be determined by respective control modules 401, 402, and 403.

The base air purifier 1 may not be operated if air purifying on a floor surface is not necessary or there is no user in front of the base air purifier 1. When the base air purifier 1 is not serving as an air purifier, the portable air purifiers 2 and 3 may be configured to discharge air such that an air flow is uniform in the room.

This application is related to co-pending U.S. application Ser. Nos. 16/821,737 filed on Mar. 17, 2020 and 16/821,806 filed on Mar. 17, 2020, the entire contents of which are hereby incorporated by reference.

Embodiments disclosed herein may provide an air cleaning or purifying system and a control method of an air cleaning or purifying system which may be implemented as a single air cleaning system suitable for a customer's own residential environment. The air cleaning system and control method may implement an air cleaning function in various configurations and methods according to a size, shape, and structure of an indoor space. The air cleaning system and control method may can perform an optimal air cleaning operation for a complicated space such as a complex shaped indoor space or a space having a complex configuration of vents or windows. The air cleaning system and control method may supply clean air to an entire indoor space, even though the indoor space may be by walls or doors.

Embodiments disclosed herein may be implemented as an air cleaning or purifying system including a robot or vacuum cleaner and at least one air purifier or cleaner to perform an air purifying operation with reference to map information received from the robot cleaner. The air cleaner may be operated in an adaptive state in an indoor space corresponding to the map information of the indoor space.

The at least one air cleaner may be provided as at least two air cleaners so that air cleaning may be performed in the indoor space by having separate air cleaners provided in separate individual rooms or by combining air cleaners in a same room for a cooperative air cleaning function. A configuration and operation of the air cleaning system may be adapted based on detailed map information of the indoor space.

One of the at least two air purifiers may be a base or main air purifier, and at least one of the at least two air purifiers may be a portable air purifier provided in a tower structure that is configured to be seated in the main air purifier. The portable air cleaner may be transported to and used in a place or room that is far from the main air purifier so that air cleaning for the entire indoor space may be performed. The main air cleaner may be used in a living room so that air cleaning may be performed appropriately in the living room. The main air purifier may receive and support the portable air purifier and may be used as a base or docking station of the portable air purifier.

At least one of the portable or main air cleaner may include a space driving decision unit or controller to determine an optimum air cleaning operation with reference to the map information. An air cleaning operation corresponding to the particular indoor space may be determined by the controller.

The controller may include a zone dividing determining unit or zone selector that determines which air cleaners of the at least two air cleaners are suitable for the air cleaning operation based on the map information. Zones determined by the robot cleaner and/or air cleaners may be mutually determined, and the portable air cleaner may be moved to a zone accordingly to perform air cleaning for the zone, which may not be reached by the main air cleaner. An entire indoor space may be treated by a single air cleaning system even though the indoor space may be divided into several areas due to walls and doors.

The zone selector may determine at least one of a zone size of each zone included in the map information, a connectivity of the zone, and a weight of the zone to correspond to the zone and the air cleaner. A division of the zone may be based on an air cleaning operation and accurately performed.

The zone selector and/or controller may include an air cleaner positioning unit or detector that determines, based on the map information, a position of the at least two individual air cleaners. An optimal air cleaning function may be performed when the two air cleaners are located in a large area. The main and/or portable air cleaners may include a display to display information according to the controller, zone selector, and/or position detector, improving convenience.

Embodiments disclosed herein may be implemented as an air cleaning or purifying system including a base or docking station having an upper and lower surface and at least two portable air cleaners or purifiers configured to be selectively placed on the upper surface of the base at positions that are laterally spaced apart from each other. The two portable air purifiers may be provided long in a vertical direction. The base or docking station may also be an air purifier, and may be referred to as a main air purifier. An air cleaning operation may be performed in an entire or common indoor space.

The main air purifier may be provided with an air purifying function. The main air purifier and the at least two portable air purifiers may cooperate with each other to perform a combined or customized air purifying function, improving air cleaning efficiency of the air purifying system.

Map information may be provided and updated as current map information at a current time point. Map information may be collected by a robot or vacuum cleaner that moves around an indoor space during vacuum cleaning. As a configuration of the indoor space is changed, for example, when a door is closed, an air cleaning operation may be adapted.

Embodiments disclosed herein may be implemented as an air cleaning or purifying system comprising a robot or vacuum cleaner for perform a current cleaning and acquiring current map information of a current indoor space and at least two air purifiers to perform an air cleaning or purifying operation based on the current map information received from the robot cleaner. An optimal air cleaning operation may be maintained. The map information may include air quality information, and the air cleaning operation may adapt based on slight changes in the air quality at different locations. For example, the air cleaning system may determine that the air purifiers should be placed in different zones or areas based on air quality and map information. The at least two air purifiers may communicate with each other to cooperate with each other to perform air cleaning.

The at least two air purifiers may include at least two portable air purifiers selectively positioned on an upper surface of a base or docking station to be laterally spaced apart. The two portable air purifiers may extend in an upward direction, and may be lifted and removed from the base to be placed in various rooms so that an optimum cleaning operation may be performed to correspond to an entire indoor space.

The at least two air purifiers may include at least one air portable air purifier and a base or docking station, which may be implemented as an air purifier placed on a floor or ground surface. The at least one portable air purifier may be selectively or optionally seated on and removed from an upper surface of the base. Air purifying functions of the base and portable air purifier may combined in various combinations of modes and configured in various positions and arrangements so that the air purifying system may be used in more various modes.

Embodiments disclosed herein may be implemented as a method of controlling an air cleaning or purifying system comprising acquiring map information of an indoor space by a robot cleaner, transmitting the map information to an air cleaner or purifier, and performing air cleaning, by the air cleaner, which includes referring to the map information. The map information may include information on an entire area of the indoor space to which the clean air is supplied at the time of the air cleaning operation, increasing efficiency of air cleaning. The map information may include air quality information, locations of the robot cleaner and/or the air purifier, and an operation status of the robot cleaner and/or the air purifier.

There may be at least two air purifiers, which may be used in different rooms, zones, or areas of the indoor space. The method may include determining which zone the air purifiers should be located in to perform an air cleaning operation. An optimal air cleaning operation may be performed even for complex indoor spaces.

When performing air cleaning, at least one of the at least two air purifiers may determine where the at least two air purifiers are located within at least one zone of the interior space. An optimal air cleaning operation may be performed even if the indoor space is partitioned.

The map information may be transmitted when the robot cleaner performs vacuum cleaning so that the air purifier may acquire the map information of the indoor space more quickly at a present time point. The map information may be transmitted during cleaning or immediately after cleaning, but before a next or subsequent cleaning so that information transmission between the robot cleaner and the air cleaner may be stably performed.

Embodiments disclosed herein may provide an air purifying system having a plurality of air purifiers configured to be separated, transported, and operated in a single operation. At least one of the air purifiers may be easy to carry. The air purifying system may be conveniently operated in a variety of modes or states in accordance with a customer's own personal residential environment. Since an operation of a plurality of air purifiers may be performed, an optimum air cleaning or purifying function may be implemented and/or adjusted corresponding to a size and design (e.g., partition or wall structure) of the indoor space.

Map information of the indoor space may be obtained and the air purifying may be performed and adjusted based on the map information. An air purifying operation may be customized to each room or zone where an air purifier is located.

A cooperative or combined operation of the air purifiers may be implemented and/or adjusted according to an installation space or locations of the air purifiers, and a complex operation of a plurality of air purifiers may be performed so that an air purifying operation may be optimized and/or customized for the indoor space.

The air purifiers may communicate with each other in real time, enhancing an optimization, customization, and/or adaptation of the air purifying operation and increasing satisfaction. An air quality of the indoor space may be obtained in real time, and the air purifying operation may be instantaneously changed or quickly adjusted to supply an optimal distribution of clean air to the indoor space.

Embodiments disclosed herein may be implemented as an air purifying system comprising a robot cleaner and a first air purifier. The robot cleaner may include a case having a dust bin, a wheel assembly to move the case in an indoor space, a suction device to suction foreign matter and store the foreign matter in the dust bin, at least one of a position sensor to detect a position of the robot cleaner based on an operation of the wheel assembly or an image sensor configured to capture and store an image in front of the robot cleaner, and a controller to generate a map of the indoor space. The robot cleaner and the air purifier may be operated based on the generated map information.

A second air purifier may be configured to be seated on and removed from the first air purifier. The second air purifier may extend in the vertical direction and may include a handle. The first air purifier may include a seating groove configured to receive a bottom of the second air purifier.

The first air purifier may include an operation determining controller to determine at least one of a desired direction, volume, or speed of air discharged from the first air purifier and the second air purifier based on the generated map information. The operation determining controller may include a zone determining controller to determine a desired zone in the indoor space in which the second air purifier is placed.

A determination of the desired zone may be based on at least one of a zone size, a zone connectivity, or a zone weight. The zone connectivity may be a value related to a number of other zones the zone is connected to via a door. The zone weight may be a value related to a number of other zones the zone is partitioned from via a wall.

The operation determining controller may further include an air purifier positioning controller to determine a desired location within the zone that the second air purifier is placed. A display may be configured to indicate determinations by the operation determining controller.

A base may be provided. The base may have a first seating groove formed on an upper surface. The first seating groove may be configured to receive and support the first air purifier.

A second air purifier may be provided. The base may include a second seating groove to support the second air purifier. The first and second seating grooves may be configured to charge the first and second air purifiers. The base may be configured to operate as a third air purifier and may include a fan and a filter.

As the robot cleaner travels during cleaning, the robot cleaner may continuously detect a position or capture an image to generate current map information corresponding to a current time.

Embodiments disclosed herein may be implemented as an air purifying system comprising a robot cleaner and a first air purifier. The robot cleaner may have a suction device, a traveling device, and a controller. The robot cleaner may be configured to autonomously travel via the traveling device during cleaning via the suction device, obtain position information, and generate map information based on the obtained position information via the controller. The first air purifier may have a display, a filter, a fan, and an air guide device. The display, filter, and air guide device may be operated based on the generated map information.

A second air purifier may be provided. The second air purifier may have a display, a filter, a fan, and an air guide device configured to be operated based on the generated map information. A third air purifier may be provided. The third air purifier may have a fan, a filter, a first seating groove, and a second seating groove formed in an upper surface. The first air purifier may be configured to be seated in and lifted from the first seating groove. The second air purifier may be configured to be seated in and lifted from the second seating groove. The first, second, and third air purifiers may be configured to be controlled independently.

The first and second seating grooves may be spaced apart in a horizontal direction. The first and second air purifiers may have a cylindrical shape extending in a vertical direction. The first, second, and third air purifiers may each include a communication module to exchange data with each other and with the robot cleaner.

Embodiments disclosed herein may be implemented as a method of controlling an air purifying system comprising vacuum cleaning via a robot cleaner travelling autonomously in an indoor space, acquiring map information during the vacuum cleaning, transmitting the acquired map information to at least one air purifier, and operating at least one air purifier based on the acquired map information.

The method may further include dividing the indoor space in at least one zone and determining a zone of the at least one zone in which the air purifier is placed. The method may further include determining a location within the determined zone that the air purifier is placed. The method may further include displaying the determined zone and location on the display.

The method may further include correcting map information during vacuum cleaning and transmitting the corrected map information. Transmitting acquired map information and corrected map information may be performed during vacuum cleaning.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air purifying system comprising:
    a robot cleaner; and
    a first air purifier,
    the robot cleaner including:
        a case having a dust bin,
        a wheel assembly to move the case in an indoor space,
        a suction device to suction foreign matter and store the foreign matter in the dust bin,
        at least one of a position sensor to detect a position of the robot cleaner based on an operation of the wheel assembly or an image sensor configured to capture and store an image in front of the robot cleaner, and
        a controller to generate map information of the indoor space, wherein the robot cleaner and the air purifier are operated based on the generated map information,
    wherein the first air purifier includes an operation determining controller to determine at least one of a desired direction, a desired volume, or a desired speed of air discharged from the first air purifier based on the generated map information.

2. The air purifying system of claim 1, further comprising a second air purifier configured to be seated on and removed from the first air purifier.

3. The air purifying system of claim 2, wherein the second air purifier extends in the vertical direction and includes a handle, and the first air purifier includes a seating groove configured to receive a bottom of the second air purifier.

4. The air purifying system of claim 2, wherein the operation determining controller is further to determine at least one of a desired direction, a desired volume, or a desired speed of air discharged from the second air purifier based on the generated map information.

5. The air purifying system of claim 4, wherein the operation determining controller includes a zone determining controller to determine a desired zone in the indoor space in which the second air purifier is placed.

6. The air purifying system of claim 5, wherein a determination of the desired zone is based on at least one of a zone size, a zone connectivity, or a zone weight, the zone connectivity being a value related to a number of other zones the zone is connected to via a door and the zone weight being a value related to a number of other zones the zone is partitioned from via a wall.

7. The air purifying system of claim 4, wherein the operation determining controller further includes an air purifier positioning controller to determine a desired location within the zone that the second air purifier is placed.

8. The air purifying system of claim 4, further including a display configured to indicate determinations by the operation determining controller.

9. The air purifying system of claim 1, further comprising a base having a first seating groove formed on an upper surface, wherein the first seating groove is configured to receive and support the first air purifier.

10. The air purifying system of claim 9, further comprising a second air purifier, wherein the base includes a second seating groove to support the second air purifier, the first and second seating grooves being configured to charge the first and second air purifiers, and the base is configured to operate as a third air purifier and includes a fan and a filter.

11. The air purifying system of claim 1, wherein, as the robot cleaner travels during cleaning, the robot cleaner continuously detects a position or captures an image to generate current map information corresponding to a current time.

12. An air purifying system, comprising:
    a robot cleaner having a suction device, a traveling device, and a controller, the robot cleaner being configured to autonomously travel via the traveling device during cleaning via the suction device, obtain position information, and generate map information based on the obtained position information via the controller; and
    a first air purifier having a display, a filter, a fan, and an air guide device, wherein the display, filter, and air guide device are operated based on the generated map information.

13. The air purifying system of claim 12, further comprising:
    a second air purifier having a display, a filter, a fan, and an air guide device configured to be operated based on the generated map information; and
    a third air purifier having a fan, a filter, a first seating groove, and a second seating groove formed in an upper surface, wherein the first air purifier is configured to be seated in and lifted from the first seating groove and the second air purifier is configured to be seated in and lifted from the second seating groove, wherein the first, second, and third air purifiers are configured to be controlled independently.

14. The air purifying system of claim 13, wherein the first and second seating grooves are spaced apart in a horizontal direction, and the first and second air purifiers have a cylindrical shape extending in a vertical direction.

15. The air purifying system of claim 13, wherein the first, second, and third air purifiers include a communication module to exchange data with each other and with the robot cleaner.

16. A method of controlling an air purifying system, comprising:
- vacuum cleaning via a robot cleaner travelling autonomously in an indoor space;
- acquiring map information during the vacuum cleaning;
- transmitting the acquired map information to at least one air purifier; and
- operating at least one air purifier based on the acquired map information,
- wherein at least one of a desired direction, a desired volume, or a desired speed of air discharged from the air purifier is determined based on the acquired map information.

17. The method of claim 16, further including dividing the indoor space in at least one zone and determining a zone of the at least one zone in which the air purifier is placed.

18. The method of claim 17, further including determining a location within the determined zone that the air purifier is placed.

19. The method of claim 18, further including displaying the determined zone and location on the display.

20. The method of claim 16, further including correcting map information during vacuum cleaning and transmitting the corrected map information, wherein transmitting acquired map information and corrected map information is performed during vacuum cleaning.

* * * * *